US011923905B2

(12) United States Patent
Luo et al.

(10) Patent No.: US 11,923,905 B2
(45) Date of Patent: Mar. 5, 2024

(54) DISTRIBUTED ANTENNA SYSTEM, METHOD AND APPARATUS

(71) Applicant: COMBA NETWORK SYSTEMS COMPANY LIMITED, Guangzhou (CN)

(72) Inventors: Manjiang Luo, Guangzhou (CN); Qiyan Fan, Guangzhou (CN); Hang Zhang, Guangzhou (CN)

(73) Assignee: COMBA NETWORK SYSTEMS COMPANY LIMITED, Guangzhou Science (CN)

( * ) Notice: Subject to any disclaimer, the term of this patent is extended or adjusted under 35 U.S.C. 154(b) by 202 days.

(21) Appl. No.: 17/618,337

(22) PCT Filed: Nov. 27, 2019

(86) PCT No.: PCT/CN2019/121365
§ 371 (c)(1),
(2) Date: Dec. 10, 2021

(87) PCT Pub. No.: WO2020/248529
PCT Pub. Date: Dec. 17, 2020

(65) Prior Publication Data
US 2022/0231763 A1    Jul. 21, 2022

(30) Foreign Application Priority Data
Jun. 12, 2019  (CN) .......................... 201910504064.8

(51) Int. Cl.
H04B 10/2575    (2013.01)
H04B 10/079     (2013.01)
H04B 10/564     (2013.01)

(52) U.S. Cl.
CPC . *H04B 10/25753* (2013.01); *H04B 10/07955* (2013.01); *H04B 10/564* (2013.01); *H04B 2210/006* (2013.01)

(58) Field of Classification Search
CPC ........ H04B 10/25753; H04B 10/07955; H04B 10/564; H04B 2210/006; H04B 10/07953;
(Continued)

(56) References Cited

U.S. PATENT DOCUMENTS

2004/0106435 A1    6/2004  Bauman et al.
2011/0135308 A1    6/2011  Tarlazzi et al.
(Continued)

FOREIGN PATENT DOCUMENTS

CN    1745560 A       3/2006
CN    201044493 Y     4/2008
(Continued)

OTHER PUBLICATIONS

Extended European Search Report dated Jul. 18, 2022, in corresponding European application No. 19933068, filed Nov. 27, 2019, 8 pages.
(Continued)

*Primary Examiner* — Hibret A Woldekidan
(74) *Attorney, Agent, or Firm* — Christensen O'Connor Johnson Kindness PLLC

(57) ABSTRACT

The present application relates to a distributed antenna system, a method and an apparatus. The distributed antenna system comprises a digital-analog expansion unit and a remote cascade chain, the remote cascade chain comprising multiple remote units cascadingly connected by means of radio frequency cable, and a first remote unit of the remote cascade chain being connected to the digital-analog expansion unit by means of radio frequency cable. The digital-analog expansion unit is used to perform a baseband pro-
(Continued)

cessing operation on a received external signal, and to perform interconversion of an analog RF signal and a digital RF signal. On this basis, the digital-analog expansion unit and the remote units use a cable connection-based daisy chain topology, which can both increase transmission bandwidth and effectively decrease transmission link costs; in addition, baseband processing being executed by the digital-analog expansion unit, and a remote unit not requiring baseband processing equipment, can effectively lower system component costs and operating power consumption. The present system is characterized by multi-mode, multi-band support and cell splitting, is easy to expand, and has low construction difficulty.

17 Claims, 15 Drawing Sheets

(58) Field of Classification Search
CPC .............. H04B 10/0795; H04B 10/272; H04B 7/2609; H04B 10/071; H04B 10/2575; H04B 10/25751; H04B 10/25752; H04B 10/25754; H04B 10/25756; H04B 10/25758; H04B 10/25759; H04B 10/56; H04B 10/079; H04W 88/085
See application file for complete search history.

(56) References Cited

U.S. PATENT DOCUMENTS

| | | | |
|---|---|---|---|
| 2012/0027145 A1* | 2/2012 | Uyehara | H04J 3/0685 375/356 |
| 2012/0106963 A1 | 5/2012 | Huang et al. | |
| 2012/0177026 A1 | 7/2012 | Uyehara et al. | |
| 2015/0373722 A1* | 12/2015 | Lange | H04B 7/026 370/315 |
| 2016/0345259 A1* | 11/2016 | Heidler | H04W 52/0261 |
| 2017/0118768 A1 | 4/2017 | Seo et al. | |
| 2017/0280405 A1 | 9/2017 | Feng et al. | |
| 2019/0296783 A1* | 9/2019 | Naniwa | H04B 1/12 |
| 2023/0283304 A1* | 9/2023 | Hofman | H04L 5/1461 370/278 |

FOREIGN PATENT DOCUMENTS

| | | | |
|---|---|---|---|
| CN | 102082586 | A | 6/2011 |
| CN | 102725994 | A | 10/2012 |
| CN | 102792766 | A | 11/2012 |
| CN | 202587393 | U | 12/2012 |
| CN | 102883334 | A | 1/2013 |
| CN | 103973346 | A | 8/2014 |
| CN | 203872191 | U | 10/2014 |
| CN | 104852757 | A | 8/2015 |
| CN | 105406925 | A | 3/2016 |
| CN | 206332853 | U | 7/2017 |
| CN | 107343284 | A | 11/2017 |
| CN | 110278011 | A | 9/2019 |
| KR | 20010069150 | A | 7/2001 |
| KR | 20180083454 | A | 7/2018 |

OTHER PUBLICATIONS

PCT International Application No. PCT/CN2019/121365, International Search Report dated Mar. 11, 2020, 3 pages.
The State Intellectual Property Office of People's Republic of China Application No. 201910504064.8, Office Action dated Apr. 30, 2020, 10 pages.
The State Intellectual Property Office of People's Republic of China Application No. 201910504064.8, Office Action dated Sep. 30, 2020, 20 pages.
The State Intellectual Property Office of People's Republic of China Application No. 201910504064.8, Supplementary Search dated Feb. 18, 2021, 1 page.

* cited by examiner

DISTRIBUTED ANTENNA SYSTEM, METHOD AND APPARATUS

CROSS REFERENCE TO RELATED APPLICATIONS

This application is a National Stage of International Application No. PCT/CN2019/121365, filed Nov. 27, 2019 which claims priority to Chinese Patent Application No. 201910504064.8, filed on Jun. 12, 2019, the contents of which are expressly incorporated by reference herein in their entirety.

TECHNICAL FIELD

The present application relates to the field of communication technologies, and in particular, to a distributed antenna system, a method and an apparatus.

BACKGROUND

In the 4th Generation Mobile Communication Technology (4G) era, a new digital indoor distribution system is introduced into some service-intensive scenarios (such as airports, railway stations and large venues). The new digital indoor distribution system has advantages of simple deployment, low construction difficulty, flexible expansion, convenient operation and maintenance and the like, and greatly improves network capacity.

However, in the upcoming 5th-Generation (5G) era, in order to cope with more and more new mobile services, rigid requirements such as large bandwidth, high capacity and low latency are put forward on the network. Its construction is characterized by larger bandwidth, higher frequency band and more antennas (MIMO, A plurality of-Input A plurality of-Output). Due to the high frequency band, device performance is required to be improved in order to increase capacity and improve user experience. In addition, antennas may be placed at more point positions, and a plurality of antennas is required at each point position to achieve 2T2R or 4T4R. That is, the new digital indoor distribution system has a problem of high construction costs for 5G indoor distribution scenarios.

SUMMARY

On this basis, there is a need to provide a distributed antenna system, a method and an apparatus with respect to the problem of high construction costs in the new digital indoor distribution system.

In order to achieve the above objective, in an aspect, embodiments of the present application provide a distributed antenna system, including: a digital-analog expansion unit and a remote cascade chain, the remote cascade chain including a plurality of remote units cascadingly connected by means of radio frequency cable, and a first remote unit of the remote cascade chain being connected to the digital-analog expansion unit by means of radio frequency cable.

The digital-analog expansion unit is configured to perform, through a first baseband processing module inside the digital-analog expansion unit, a baseband processing operation on a downlink digital radio frequency signal transmitted by a source unit through an optical fiber, and perform digital-to-analog conversion through a first signal conversion module inside the digital-analog expansion unit, to obtain a downlink analog radio frequency signal to be transmitted to the remote cascade chain; or the digital-analog expansion unit is configured to perform, through the first signal conversion module, analog-to-digital conversion on an uplink analog radio frequency signal transmitted by the remote cascade chain, and perform a baseband processing operation through the first baseband processing module, to obtain an uplink digital radio frequency signal to be transmitted to the source unit through an optical fiber.

The remote unit is configured to perform analog radio frequency signal interaction with a terminal device, and two adjacent ones of the remote units performing analog radio frequency signal interaction by means of the radio frequency cable.

In another aspect, the embodiments of the present application further provide a signal transmission method applied to the distributed antenna system described above. The signal transmission method including:
  acquiring, by the remote unit, a first uplink analog radio frequency signal of a terminal and a second uplink analog radio frequency signal transmitted by a lower-stage remote unit;
  combining, by the remote unit, the first uplink analog radio frequency signal with the second uplink analog radio frequency signal to obtain an uplink analog radio frequency signal of a current remote unit, and transmitting the uplink analog radio frequency signal of the current remote unit to an upper-stage remote unit or the digital-analog expansion unit; and
  performing, by the digital-analog expansion unit, analog-to-digital conversion and baseband processing on the acquired uplink analog radio frequency signal, to obtain an uplink digital radio frequency signal to be transmitted to the source unit through an optical fiber.

In an embodiment, a signal transmission method is provided, applied to the distributed antenna system described above. The signal transmission method including:
  performing, by the digital-analog expansion unit, baseband processing and digital-to-analog conversion on a downlink digital radio frequency signal transmitted by a source unit through an optical fiber, to obtain a downlink analog radio frequency signal, and transmitting the downlink analog radio frequency signal to the remote cascade chain; and
  acquiring, by the remote unit, the downlink analog radio frequency signal, and performing downlink radio frequency signal transmission based on the downlink analog radio frequency signal.

In an embodiment, a gain control method is provided, applied to the distributed antenna system described above; the gain control method including:
  acquiring, by the remote unit, a radio frequency signal transmitted by the digital-analog expansion unit by means of radio frequency cable, and measuring the radio frequency signal, to obtain a first power value, the radio frequency signal being a signal generated by the digital-analog expansion unit according to a preset frequency band and a preset power value;
  obtaining, by the remote unit, a radio frequency signal insertion loss based on the first power value and the preset power value, and obtaining a cable length according to the radio frequency signal insertion loss and the preset frequency band; and
  obtaining, by the remote unit, a target signal insertion loss based on the cable length and a target signal frequency band, and matching an attenuation value of a digital control attenuator based on the target signal insertion loss, target transmitting power and a gain value.

In an embodiment, a gain control apparatus is provided, applied to a distributed antenna system, and the gain control apparatus being arranged in each of the remote units. The gain control apparatus includes:

a power measurement module configured to acquire a radio frequency signal transmitted by the digital-analog expansion unit by means of radio frequency cable, and measure the radio frequency signal, to obtain a first power value, the radio frequency signal being a signal generated by the digital-analog expansion unit according to a preset frequency band and a preset power value;

a cable length acquisition module configured to obtain a radio frequency signal insertion loss based on the first power value and the preset power value, and obtain a cable length according to the radio frequency signal insertion loss and the preset frequency band; and an attenuation value matching module configured to obtain a target signal insertion loss based on the cable length and a target signal frequency band, and match an attenuation value of a digital control attenuator based on the target signal insertion loss, target transmitting power and a gain value.

One of the above technical solutions has the following advantages and beneficial effects.

The distributed antenna system includes a digital-analog expansion unit and a remote cascade chain, the remote cascade chain includes a plurality of remote units cascadingly connected by means of radio frequency cable, and a first remote unit of the remote cascade chain is connected to the digital-analog expansion unit by means of radio frequency cable. The digital-analog expansion unit is configured to perform a baseband processing operation on a received external signal through a first baseband processing module inside the digital-analog expansion unit, and to perform interconversion of an analog radio frequency signal and a digital radio frequency signal through a first signal conversion module inside the digital-analog expansion unit, to obtain an uplink digital radio frequency signal to be transmitted to a source unit or a downlink analog radio frequency signal to be transmitted to the remote cascade chain. The remote unit is configured to perform analog radio frequency signal interaction with a terminal device, and two adjacent remote units perform analog radio frequency signal interaction by means of the radio frequency cable. On this basis, the digital-analog expansion unit and the remote units use a cable connection-based daisy chain topology, which can both increase transmission bandwidth and effectively decrease transmission link costs. In addition, baseband processing being executed by the digital-analog expansion unit, and a remote unit not requiring baseband processing equipment, can effectively lower system component costs and operating power consumption. At the same time, coverage of the remote unit is not limited by bandwidth and the remote unit supports a plurality of signal access coverage. The present system is characterized by multi-mode, multi-band support and cell splitting, is easy to expand, and has low construction difficulty.

BRIEF DESCRIPTION OF THE DRAWINGS

Other features, objectives, and advantages of the present application will become apparent by reading detailed descriptions of non-limiting embodiments made with reference to the following accompanying drawings.

DETAILED DESCRIPTION OF THE EMBODIMENTS

Figure 1:
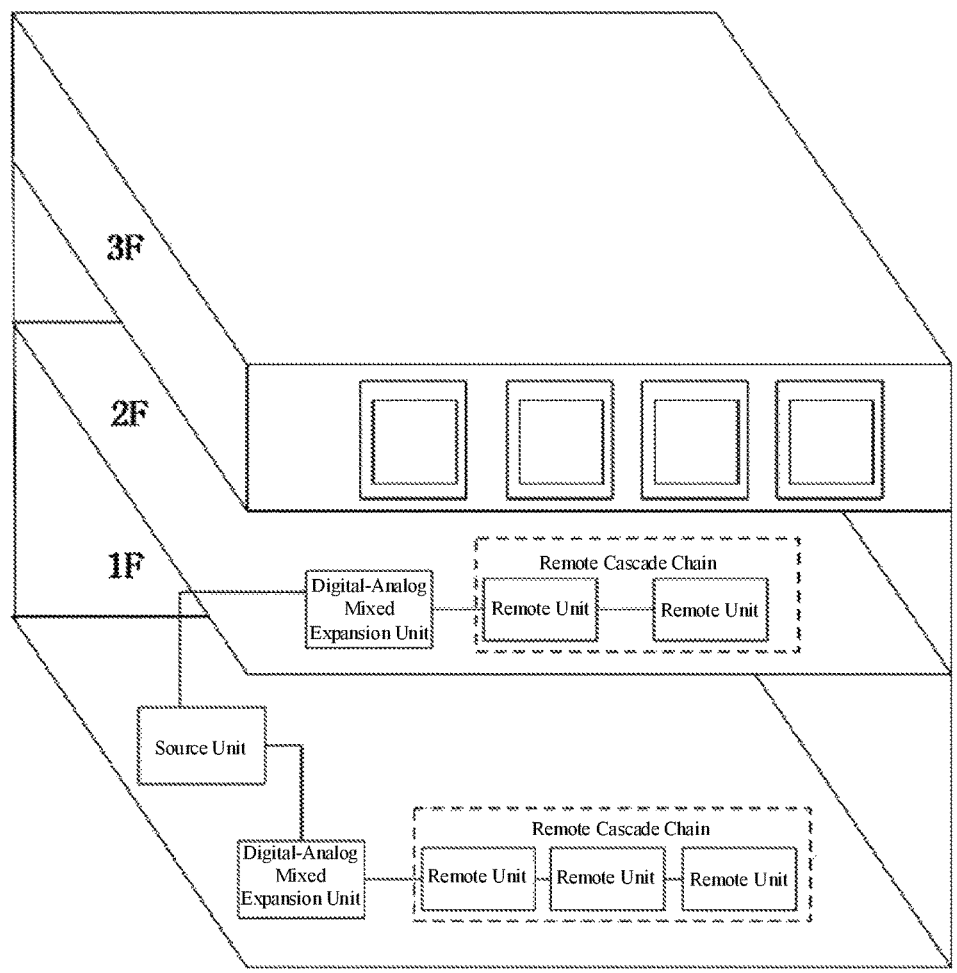
FIG. 1 is a schematic diagram illustrating an application scenario of a distributed antenna system according to an embodiment.

To facilitate understanding of the present application, a more comprehensive description of the present application will be given below with reference to the relevant accompanying drawings. Preferred embodiments of the present application are given in the drawings. However, the present application may be implemented in many different forms and is not limited to the embodiments described herein. Rather, these embodiments are provided to make the contents disclosed in the present application more fully understood.

It is to be noted that, when one element is considered to be "connected to" another element, it may be directly connected to and integrated with the other element or an intermediate element may co-exist. The terms "first port", "first transport port", "another end" and similar expressions used herein are for illustrative purposes only.

Unless defined otherwise, all technical and scientific terms used herein have the same meanings as would generally understood by those skilled in the technical field of the present application. The terms used herein in the specification of the present application are for the purpose of describing specific embodiments only, and are not intended to limit the present application. The term "and/or" used herein includes any and all combinations of one or more related listed items.

With the development of mobile Internet communication technologies and the approach of 5G commercial use, how to build a high-performance and low-cost indoor distribution network is facing a huge challenge. In the 2-Generation wireless telephone technology (2G)/3rd-Generation (3G) era, mobile communication operating frequency bands are low, and an indoor coverage scheme is mainly to use outdoor macro station signals for indoor coverage, and/or adopt a conventional indoor distributed antenna system (DAS) (namely, a remote radio unit (RRU) is used as a source for indoor signal coverage using feeders and indoor distributed antennas), which can solve the problem of signal coverage and satisfy voice services.

In a conventional DAS, passive devices are mainly used, which has a mature industrial chain, has advantages of low investment, a simple system, etc., and may simply perform multi-band expansion by combination in the later stage. However, under conditions requiring a plurality of communication channels, such as 2T2R and 4T4R multiple-input multiple-output (MIMO) systems required by 5G, construction costs for the conventional DAS may double. At the same time, due to factors such as the inconsistency of the passive devices and a signal transmission insertion loss, the conventional DAS cannot fully reflect the performance of the MIMO system. Moreover, current devices do not support high frequency bands, which is unfavorable for expansion and smooth system evolution. In addition, engineering construction of the conventional DAS is difficult, with many hidden troubles and troubleshooting difficulties.

The new digital indoor distribution system introduced in the 4G era has advantages of simple engineering implementation, visual operation and maintenance, simple implementation of multi-channel MIMO, easy expansion and evolution, and the like. However, under same specifications, construction costs of the new digital indoor distribution system are several times higher than those of the conventional DAS. Besides, all the new digital indoor distribution systems are active systems, and digital signals are transmitted through network cables or optical fibers, which requires huge energy consumption. At the same time, in digital transmission, the bandwidth is limited by rates of optical modules or network cables. If a larger bandwidth is required or the MIMO system such as 2T2R or 4T4R is supported, a transmission bandwidth is required to increase proportionally, and a performance-matching device (such as an analog-to-digital converter (ADC))/a digital to analog converter (DAC))/a field-programmable gate array (FPGA)) is used for processing, with costs and power consumption also increased greatly.

To this end, the present application provides a distributed antenna system, which may be applied to an application environment shown in FIG. 1. A digital-analog expansion unit configured for baseband processing and signal conversion is arranged between a source unit and a remote unit, to form a three-layer structure of the source unit, the digital-analog expansion unit and the remote unit. Moreover, the digital-analog expansion unit cascades a plurality of remote units by using radio frequency cable, to form a daisy chain topology. Costs of remote coverage can be effectively reduced while the bandwidth is increased. At the same time, the system supports a plurality of signal access coverage, and is characterized by multi-mode, multi-band support, expansion and cell splitting. On this basis, the system adopts a digital-analog hybrid transmission manner, which has advantages of simple engineering implementation, controllable management, multi-channel MIMO and convenient expansion, and meanwhile, may also avoid disadvantages of high construction costs, high power consumption and limited transmission bandwidth.

Figure 2:
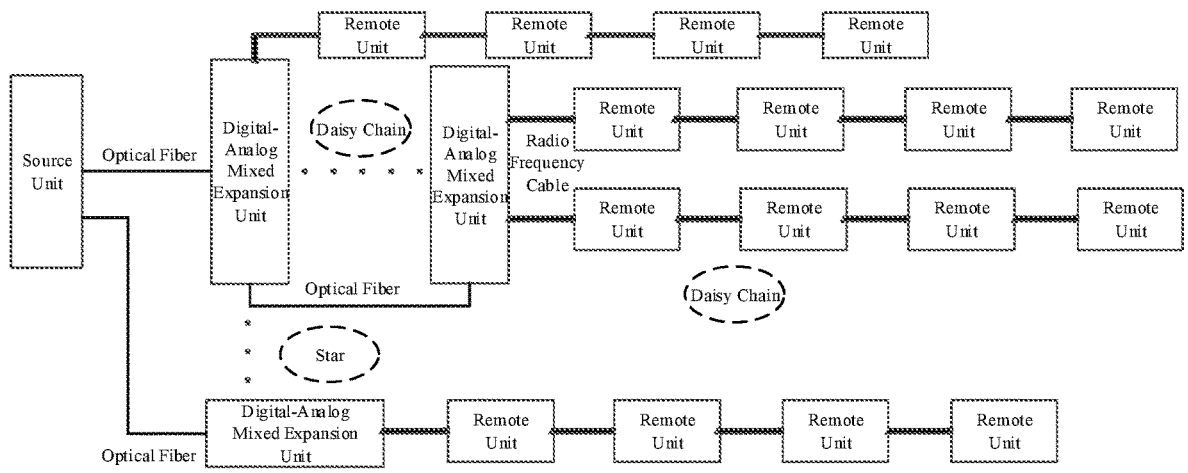
FIG. 2 is a first schematic structural diagram illustrating the distributed antenna system according to an embodiment.

Exemplarily, as shown in FIG. 2, the distributed antenna system includes at least one digital-analog expansion unit connected to a source unit and at least two remote units. A daisy chain topology connection structure is adopted between the remote units, to form a remote cascade chain. Moreover, the remote unit at a head end of the remote cascade chain is connected to the digital-analog expansion unit by means of radio frequency cable. The digital-analog expansion unit may be connected to at least one remote cascade chain. In addition, the distributed antenna system may include at least two digital-analog expansion units. A star topology connection structure and/or a daisy chain topology connection structure may be adopted between one source unit and a plurality of digital-analog expansion units. It is to be noted that the daisy chain topology mentioned in the embodiment of the present application is a linear daisy chain topology.

Figure 3:
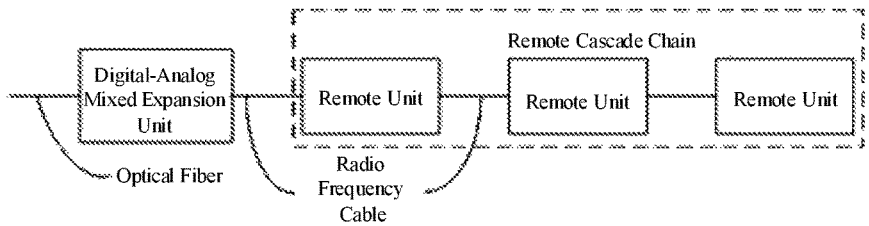
FIG. 3 is a second schematic structural diagram illustrating the distributed antenna system according to an embodiment.

In an embodiment, a distributed antenna system is provided, which, as shown in FIG. 3, includes a digital-analog expansion unit and a remote cascade chain, the remote cascade chain includes a plurality of remote units cascadingly connected by means of radio frequency cable, and a first remote unit of the remote cascade chain is connected to the digital-analog expansion unit by means of radio frequency cable.

The digital-analog expansion unit is configured to perform, through a first baseband processing module inside the digital-analog expansion unit, a baseband processing operation on a downlink digital radio frequency signal transmitted by a source unit through an optical fiber, and perform digital-to-analog conversion through a first signal conversion module inside the digital-analog expansion unit, to obtain a downlink analog radio frequency signal to be transmitted to the remote cascade chain; or the digital-analog expansion unit is configured to perform, through the first signal conversion module, analog-to-digital conversion on an uplink analog radio frequency signal transmitted by the remote cascade chain, and perform a baseband processing operation through the first baseband processing module, to obtain an uplink digital radio frequency signal to be transmitted to the source unit through an optical fiber.

The remote unit is configured to perform analog radio frequency signal interaction with a terminal device, and two adjacent remote units perform analog radio frequency signal interaction by means of the radio frequency cable.

Specifically, in the distributed antenna system, the digital-analog expansion unit and the remote cascade chain are connected by means of radio frequency cable. A single digital-analog expansion unit may be connected to a plurality of remote cascade chains and perform analog radio frequency signal transmission with the remote cascade chains respectively by means of radio frequency cable. The remote units in the remote cascade chain are successively cascaded by means of radio frequency cable, and the first remote unit of the remote cascade chain is connected to the digital-analog expansion unit to form a daisy chain topology. Adjacent remote units perform analog radio frequency signal transmission by means of radio frequency cable. In addition, the digital-analog expansion unit may be connected to the source unit through an optical fiber, and perform digital radio frequency signal transmission with the source unit in an optical signal mode.

It is to be noted that the digital-analog expansion unit is configured to perform baseband processing on external data and further configured for analog-to-digital conversion or digital-to-analog conversion. The external data is data outside the digital-analog expansion unit, for example, data from the remote unit, data from the source unit, and the like. Specifically, a baseband processing module and a signal conversion module are arranged inside the digital-analog expansion unit. The remote unit is configured to realize signal coverage and perform uplink and downlink analog radio frequency signal transmission. Specifically, a communication link module, including radio frequency devices such as an antenna and a filter, is arranged inside the remote unit.

For an uplink signal link, the remote units receive uplink analog radio frequency signals through respective antennas. A current remote unit may process, such as filter or amplify, the received analog radio frequency signal and then transmit it to an upper-stage remote unit by means of radio frequency cable. The upper-stage remote unit receives a signal from a lower-stage remote unit, combines the signal with a signal received through an antenna and obtained by processing, and continuously transmits the combined signal to an upper-stage remote unit or the digital-analog expansion unit by means of radio frequency cable. The digital-analog expansion unit receives the combined signal of the remote unit transmitted by a remote cascade chain, converts the uplink analog radio frequency signal obtained by combination into an uplink digital radio frequency signal and performs baseband processing, and then transmits the uplink digital radio frequency signal obtained by baseband processing to the source unit optically.

For a downlink signal link, the source unit transmits a downlink digital radio frequency signal optically (through an optical fiber), i.e., a downlink optical signal, to the digital-analog expansion unit. The digital-analog expansion unit performs baseband processing on the received downlink digital radio frequency signal, then obtains a downlink analog radio frequency signal by digital-to-analog conversion, and transmits the downlink analog radio frequency signal to the remote cascade chain by means of radio frequency cable. Each remote unit in the remote cascade chain obtains the downlink analog radio frequency signal by coupling from the radio frequency cable, filters and amplifies the signal, and then transmits it by means of the radio frequency cable, so as to realize signal coverage.

In the embodiment of the present application, the digital-analog expansion unit may be connected to the source unit through an optical fiber, and use digital optical fiber transmission to diversify source access. That is, the source unit may be a building base band unit (BBU) or a radio remote unit (RRU). The digital-analog expansion unit is connected to the remote cascade chain by means of radio frequency cable. The digital-analog expansion unit can couple a power signal, a monitoring signal and the like in the radio frequency cable. The remote unit may obtain the power signal and the like by coupling from the radio frequency cable, and then realize active amplification of a radio frequency signal. On this basis, a number of the remote units on the remote cascade chain may be set according to an actual signal coverage requirement. When the remote unit is required to be added, the remote unit is required to be connected after a final remote unit, which facilitates system evolution and expansion, and compared with the conventional DAS, can realize more flexible power coverage with higher power, and can monitor the remote unit and timely acquire configuration information, alarm information, state information, insertion loss information and the like of each remote unit.

Figure 4:
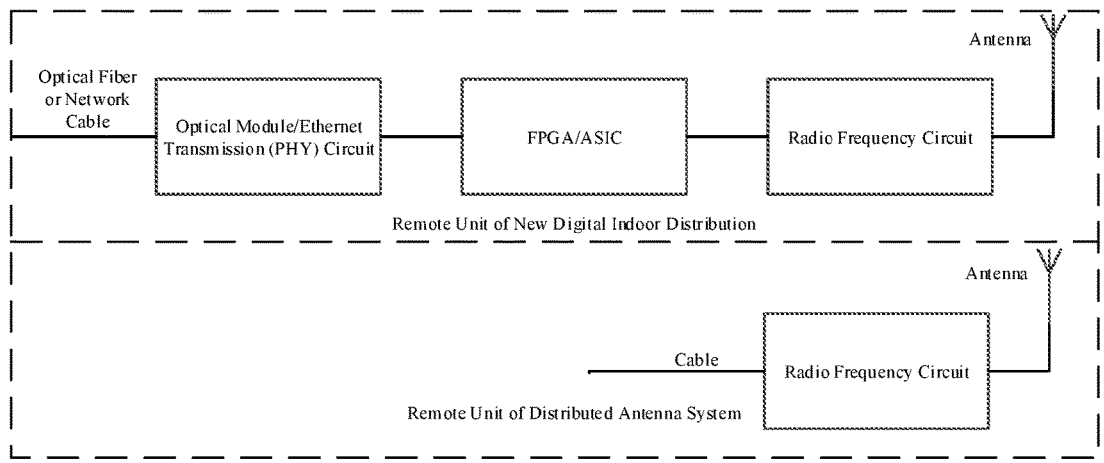
FIG. 4 is a comparison diagram illustrating remote units of the distributed antenna system and a new digital indoor distribution system according to an embodiment.

The distributed antenna system is required to be provided with a plurality of remote units to ensure overall coverage of signals. At the same time, with an increase in bandwidth, the performance of devices on the remote unit is also required to be upgraded accordingly. Therefore, costs and power consumption of the remote unit are high in the system. In the embodiment of the present application, the digital-analog expansion unit is provided with a baseband processing module and a signal conversion module, and the remote unit is not required to be provided with any baseband processing device, which saves costs of the baseband processing device (such as an FPGA or an application specific integrated circuit (ASIC)), as shown in FIG. 4. Moreover, compared with the new indoor distribution system that uses an optical fiber or network cable as a transmission medium, in the embodiment of the present application, each remote unit of the remote cascade chain uses radio frequency cable as a transmission medium for cascade, which may effectively reduce construction costs and power consumption. At the same time, the remote unit is not required to be provided with an optical processing device, an Ethernet transmission circuit and the like, which may further reduce the costs. Specifically, in the new indoor distribution system, the baseband processing device and the transmission medium have high costs and high power consumption, while based on the system according to the embodiment of the present application, the construction costs may be greatly reduced and the power consumption may also be reduced accordingly.

Figure 5:
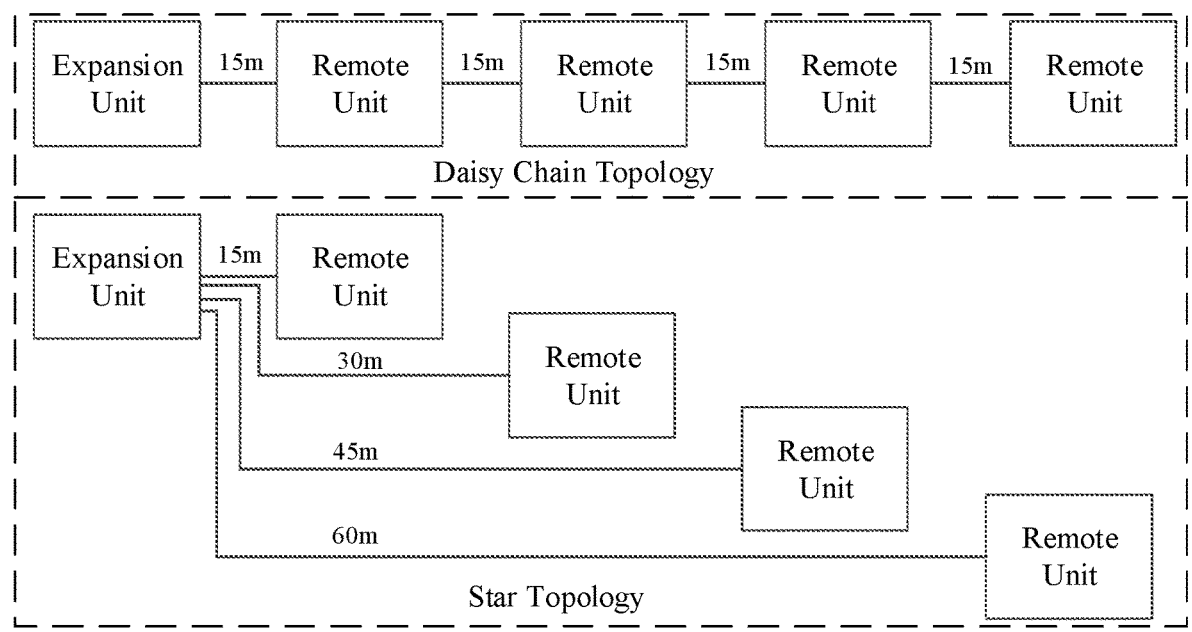
FIG. 5 is a first comparison diagram illustrating a daisy chain topology and a star topology according to an embodiment.

Further, in the embodiment of the present application, the remote units are cascaded by using the daisy chain topology, which, compared with the star topology used in the new indoor distribution system, may greatly reduce engineering construction difficulty, save a usage amount of the radio frequency cable and reduce the construction costs. For example, as shown in FIG. 5, if each remote unit is arranged at an interval of 15 m (meters), a transmission medium length required by arrangement of four remote units under the daisy chain topology is 60 m, while a transmission medium length required by the start topology is 15+30+45+60=150 m.

Figure 6:
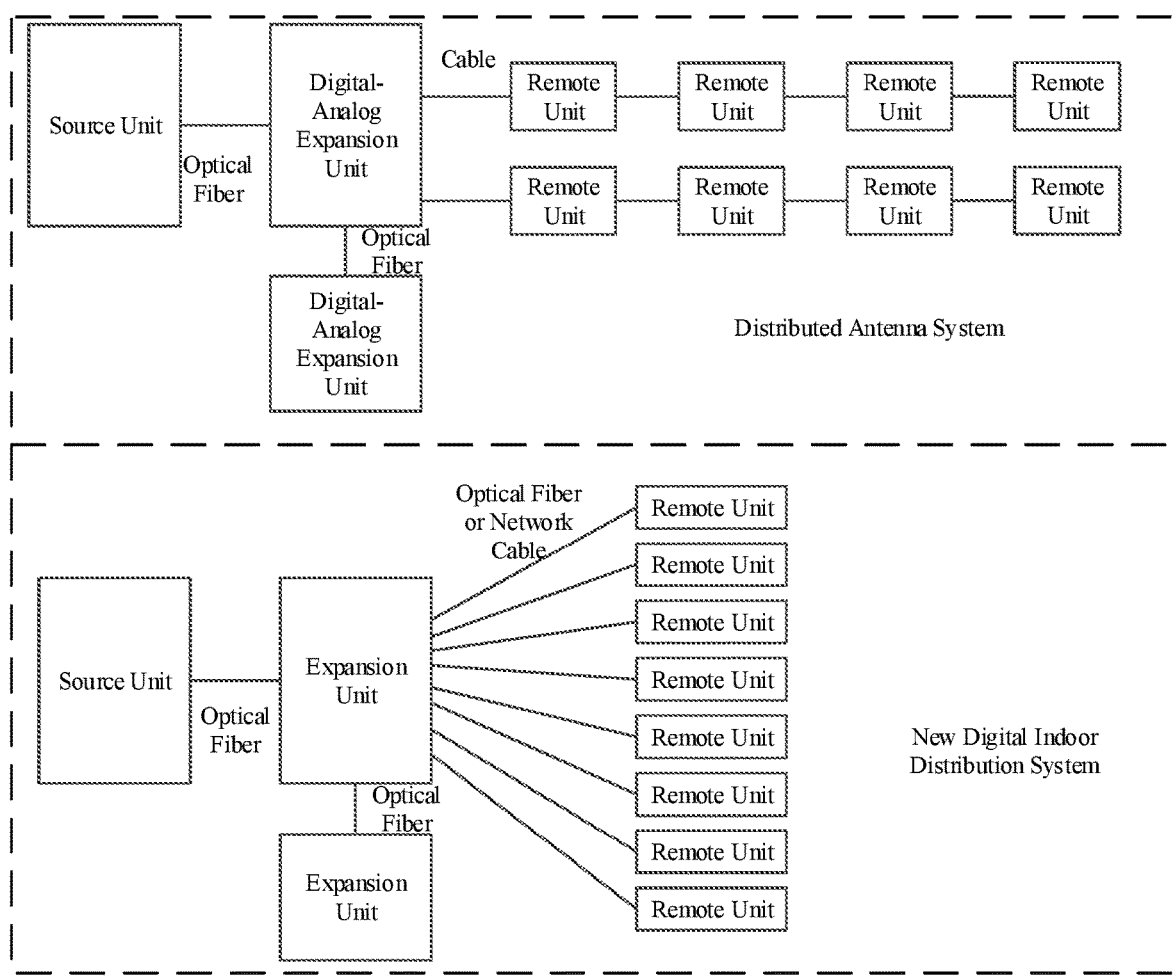
FIG. 6 is a second comparison diagram illustrating the daisy chain topology and the star topology according to an embodiment.

In addition, as shown in FIG. 6, if the digital-analog expansion units are each connected to eight remote units, in the embodiment of the present application, since the digital-analog expansion unit is connected to the source unit by using an optical fiber and may be cascaded with another digital-analog expansion unit, a single digital-analog expansion unit requires two optical fiber interfaces. The expansion unit in the new digital indoor distribution system requires an optical fiber interface connected to the source unit, an optical fiber interface cascaded with the expansion unit and eight optical fiber interfaces or network cable interfaces connected to the remote units. With the requirement for a large bandwidth, costs of each interface device are increased accordingly. Therefore, according to the embodiment of the present application, the interface devices may be saved and the costs may be reduced.

Figure 7:
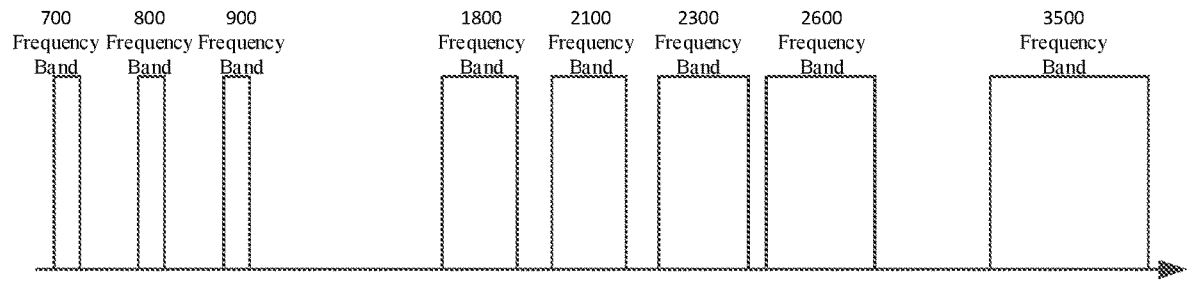
FIG. 7 is a schematic diagram illustrating frequency bands and bandwidths according to an embodiment.

It is to be noted that the digital-analog expansion unit and the remote unit as well as two adjacent remote units are connected by means of radio frequency cable respectively. Passive devices on the radio frequency cables and links can perform transmission as long as a cutoff frequency requirement is met. For example, at present, passive devices of the conventional DAS support 700 M (megahertz) to 2.7 G (gigahertz). If domestic 5G construction is to be met in the embodiment of the present application, only passive devices of 700 M to 3.5 G are required to be selected, and the transmission bandwidth is basically unlimited, as shown in FIG. 7. For a new digital indoor distribution remote end, digital optical fibers or network cables are generally used for transmission, and radio frequency signals are required to be digitized and then transmitted through a common public radio interface (CPRI) protocol, which greatly limits a digital transmission bandwidth. For example, when configured according to a 5G indoor distribution comparison standard, the remote unit realizes coverage of signals of 4T4R MIMO and 100 MHz (megahertz) bandwidth. Moreover, in the case of transmission by using a standard CPRI, its transmission bandwidth is:

$$122.88 \text{ MHz} \times 2 \times 15 \times 16/15 \times 10/8 \times 4 = 19.6608 \text{ Gbps}$$

where 122.88 MHz denotes a transmission rate of a 100 MHz bandwidth signal, 2 denotes IQ channels, 15 denotes a transmission bit width, 16/15 denotes a transmission control overhead, 10/8 denotes transmission code, and 4 denotes a number of antennas. That is, if a transmission rate of 19.66 Gbps (gigabits per second) is required to cover 4T4R/100 MHz signals by using digital optical fibers or network cables and based on the standard CPRI, an optical module and an FPGA device supporting 25 Gbps are required, which, compared with the embodiment of the present application, has high costs. At the same time, the Ethernet currently supports only up to 10 Gbps, which is difficult to meet the requirement. If compression is required to reduce the transmission rate, complexity of implementation of the system may be increased.

Figure 8:
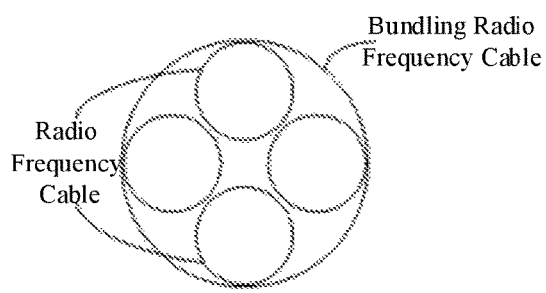
FIG. 8 is a schematic structural diagram illustrating a bundling radio frequency cable according to an embodiment.

The conventional DAS uses a 7/8 feeder with low insertion loss as a transmission medium, but its weight and diameter are large. At the same time, under the requirement of using 4T4R, four 7/8 feeders are required, which leads to difficult construction and high costs. In the embodiment of the present application, radio frequency cable with a small diameter and a light weight may be used as a transmission medium. Meanwhile, the remote unit may compensate for the insertion loss in radio frequency transmission through active radio frequency amplification. Due to the small diameter, a plurality of radio frequency cables may be bundled and combined into one cable for easy construction. As shown in FIG. 8, four radio frequency cables are combined into one bundling radio frequency cable, which can meet the requirement of 4T4R.

Figure 9:
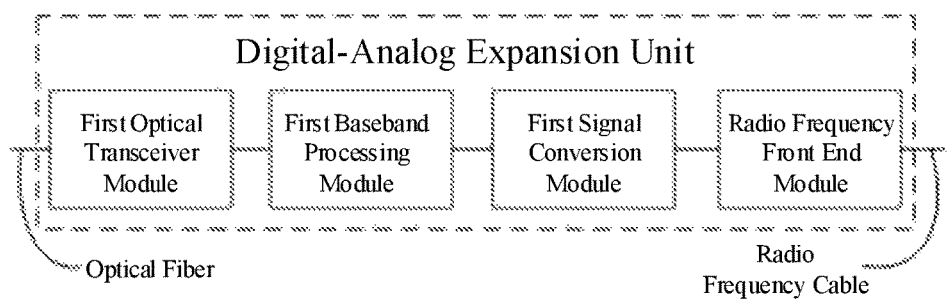
FIG. 9 is a first schematic structural diagram illustrating a digital-analog expansion unit of the distributed antenna system according to an embodiment.

Exemplarily, as shown in FIG. 9, the digital-analog expansion unit includes a first optical transceiver module, a first baseband processing module, a first signal conversion module and a radio frequency front end module successively connected. The first optical transceiver module is configured to perform optical signal interaction with the source unit. The first baseband processing module is configured to perform baseband processing on a received signal and then output the signal. The first signal conversion module is configured to perform digital radio frequency signal interaction with the baseband processing module and perform analog radio frequency signal interaction with the radio frequency front end module. The radio frequency front end module is configured to perform analog radio frequency signal interaction with the remote unit and configured to perform analog radio frequency signal processing.

Specifically, the first optical transceiver module may be configured to transmit an optical signal to or receive the optical signal from the source unit to realize interconversion of the optical signal and the digital radio frequency signal, and may be further configured to transmit the digital radio frequency signal to or receive the digital radio frequency signal from the first baseband processing module. Optionally, the first optical transceiver module may include at least one optical transceiver.

The first baseband processing module may be configured to perform baseband processing on the digital radio frequency signal transmitted by the first optical transceiver module and transmit the processed digital radio frequency signal to the first signal conversion module. At the same time, the first baseband processing module may be further configured to process a digital radio frequency signal transmitted by the first optical transceiver module and transmit the processed digital radio frequency signal to the first optical transceiver module. The first baseband processing module processes the digital radio frequency signal in any one or any combination of the following manners: digital combination, signal framing, signal deframing, serial-to-parallel conversion, parallel-to-serial conversion, clock recovery, digital intermediate frequency processing and the like. Optionally, the first baseband processing module may be an FPGA, an ASIC or the like, which is not specifically limited herein.

The first signal conversion module may be configured to perform digital-to-analog conversion on the digital radio frequency signal transmitted by the first baseband processing module and transmit an analog radio frequency signal obtained by digital-to-analog conversion to the radio frequency front end module. At the same time, the first signal conversion module may be further configured to perform analog-to-digital conversion on an analog radio frequency signal transmitted by the radio frequency front end module and transmit a digital radio frequency signal obtained by analog-to-digital conversion to the first baseband processing module. Optionally, the first signal conversion module may include a digital-to-analog converter, an analog-to-digital converter and the like, which is not specifically limited herein.

The radio frequency front end module may be configured to process the analog radio frequency signal transmitted by the first signal conversion module and then transmit it to the remote cascade chain, and may be further configured to process an analog radio frequency signal transmitted by the remote cascade chain and then transmit it to the first signal conversion module. The radio frequency front end module processes the analog radio frequency signal in any one or any combination of the following manners: filtering, frequency conversion, amplification and the like. Optionally, the radio frequency front end module may include a filter, an inverter, an amplifier, and the like, which is not specifically limited herein.

It is to be noted that a plurality of processing channels may be arranged inside each of the first baseband processing module, the first signal conversion module and the radio frequency front end module, and configured to process signals of a plurality of communication channels, so as to meet communication requirements, such as 2T2R and 4T4R.

Figure 10:
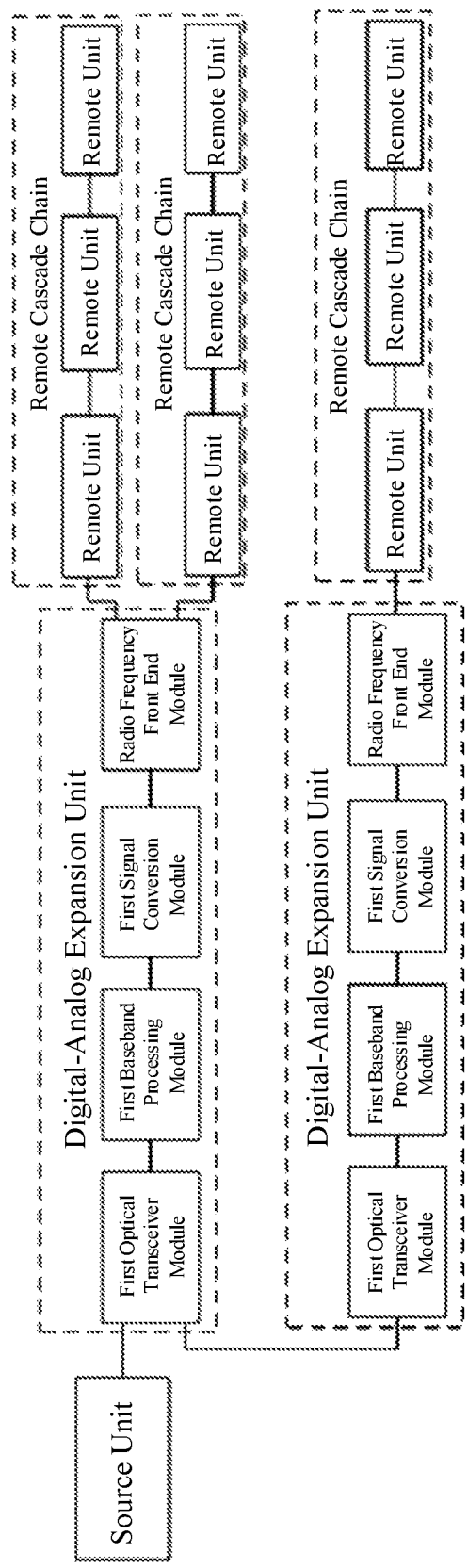
FIG. 10 is a third schematic structural diagram illustrating the distributed antenna system according to an embodiment.

Optionally, as shown in FIG. 10, the distributed antenna system includes at least two digital-analog expansion units. One of the digital-analog expansion units is connected to the source unit through an optical fiber, and two adjacent ones of the digital-analog expansion units are cascaded by an optical fiber through respective first optical transceiver modules.

Specifically, the source unit may be connected to other digital-analog expansion units through one of the digital-analog expansion units to realize signal interaction among the digital-analog expansion units. On this basis, the number of optical ports required by the source unit may be reduced, thereby reducing construction costs of the system.

For example, the distributed antenna system includes a first-stage digital-analog expansion unit including at least three optical interfaces and a plurality of second-stage digital-analog expansion units including two optical interfaces. The source unit may be connected to the second-stage digital-analog expansion units through the first-stage digital-analog expansion unit, and the second-stage digital-analog expansion unit may also be cascaded with a next-stage digital-analog expansion unit through an optical fiber. The number of the second-stage digital-analog expansion units may be less than or equal to that of the optical interfaces of the first-stage digital-analog expansion unit.

In another example, the digital-analog expansion units may be cascadingly connected through optical fibers to form a daisy chain topology, and a first digital-analog expansion unit is connected to the source unit through an optical fiber. On this basis, each digital-analog expansion unit requires only two optical interfaces without interface expansion, which can reduce the requirement of the transmission medium, and may reduce the number of optical interfaces required by the source unit and reduce the construction costs of the system.

It is to be noted that a star topology, a daisy chain topology, and a hybrid topology of star and daisy chain may be formed between the source unit and the digital-analog expansion unit. The digital-analog expansion unit may broadcast a downlink digital radio frequency signal transmitted by the source unit to the digital-analog expansion unit of next cascade, and may also transmit an uplink optical signal obtained by itself to the source unit through the digital-analog expansion unit of the previous cascade.

Exemplarily, as shown in FIG. 10, at least two remote cascade chains are provided, and one of the digital-analog expansion units corresponds to at least one of the remote cascade chains. The radio frequency front end module of each of the digital-analog expansion units is connected to the first remote unit of each corresponding remote cascade chain.

Specifically, in the distributed antenna system, according to requirements of signal coverage, the digital-analog expansion unit may be connected to a plurality of remote cascade chains to transmit analog radio frequency signals with the remote cascade chains. Specifically, the first remote unit of each remote cascade chain is connected to the radio frequency front end module of the digital-analog expansion unit. The radio frequency front end module may arrange a corresponding signal processing channel for each remote cascade chain. On this basis, the digital-analog expansion unit may be expanded to connect a plurality of remote cascade chains, which enables flexible design of signal coverage, meets layout requirements of a variety of indoor structures, and has high applicability.

Preferably, the digital-analog expansion unit is further configured to frame a downlink digital radio frequency signal transmitted by the source unit, and transmit the framed digital radio frequency signal to an adjacent digital-analog expansion unit through an optical fiber in a pass-through manner.

Specifically, the downlink digital radio frequency signal may be transmitted by broadcast. When entering the digital-analog expansion unit for baseband processing, the downlink digital radio frequency signal may be divided into two channels. One channel, after deframing, intermediate frequency, up conversion, digital filtering, digital-to-analog conversion and radio frequency front end processing, may be coupled into the radio frequency cable and transmitted to the remote cascade chain. The other channel may be framed for addition of control information, and the framed signal is transmitted to a lower-stage digital-analog expansion unit through an optical fiber in the pass-through manner. On this basis, the cascaded digital-analog expansion unit may quickly transmit a downlink signal transmitted by the source unit to a lower-stage cascaded unit to facilitate the lower-stage digital-analog expansion unit to perform signal processing and coverage, which can ensure timeliness of signal transmission in the system while reducing construction costs of the system.

Optionally, the digital-analog expansion unit is further configured to: determine, according to whether features of multi-channel signals received by a current digital-analog expansion unit are the same, whether to digitally combine the received multi-channel signal;

if a signal feature of a first uplink digital radio frequency signal is the same as that of a second uplink digital radio frequency signal, digitally combine the first uplink digital radio frequency signal with the second uplink digital radio frequency signal to obtain a third uplink digital radio frequency signal of a current digital-analog expansion unit, convert the third uplink digital radio frequency signal to obtain an uplink optical signal of the current digital-analog expansion unit, and transmit the uplink optical signal to an upper-stage digital-analog expansion unit or the source unit, the first uplink digital radio frequency signal being obtained by processing the uplink optical signal of a lower-stage digital-analog expansion unit by the current digital-analog expansion unit, and the second uplink digital radio frequency signal being obtained by performing analog-to-digital conversion and baseband processing on the uplink analog radio frequency signal of the remote cascade chain connected to the current digital-analog expansion unit by the current digital-analog expansion unit; and if the signal feature of the first uplink digital radio frequency signal is different from that of the second uplink digital radio frequency signal, convert the first uplink digital radio frequency signal and the second uplink digital radio frequency signal respectively to obtain corresponding uplink optical signals, and transmit the uplink optical signals to the upper-stage digital-analog expansion unit or the source unit.

Specifically, the digital-analog expansion unit may receive signals of the remote cascade chains connected thereto and signals of the cascaded digital-analog expansion units, and digitally combine, according to signal features, signals having the same signal feature in the multi-channel signals, thereby reducing the bandwidth occupied by the signal when transmitted to the source unit and improving the utilization of the transmission medium and the device. The signal feature includes any one or any combination of the following parameters: standard, frequency band, cell and the like.

Specifically, if the digital-analog expansion units are cascaded, a lower-stage digital-analog expansion unit transmits an uplink digital radio frequency signal obtained to a current digital-analog expansion unit through an optical fiber. If the transmitted uplink digital radio frequency signal has a same feature (such as a same standard, a same frequency band or a same cell) as an uplink digital radio frequency signal obtained by the current digital-analog expansion unit by processing, digital addition (belonging to digital combination) is required, and then an uplink digital radio frequency signal obtained by addition is converted into an optical signal and transmitted to the upper-stage digital-analog expansion unit or the source unit. If they do not have the same feature, the signal transmitted from the lower stage is required to be transmitted to the upper-stage digital-analog expansion unit or the source unit in the pass-though manner. If the signal transmitted from the lower stage may be digitally added, the bandwidth transmitted by the current digital-analog expansion unit to the upper stage is not occupied. If the signal transmitted from the lower stage is required to be transmitted to the upper stage in the pass-though manner, the signal is required to occupy an extra transmission bandwidth. The signal feature may be a signal standard, frequency band, cell or the like. It is to be noted that the signal feature does not relate to information content carried by the signal.

Figure 11:
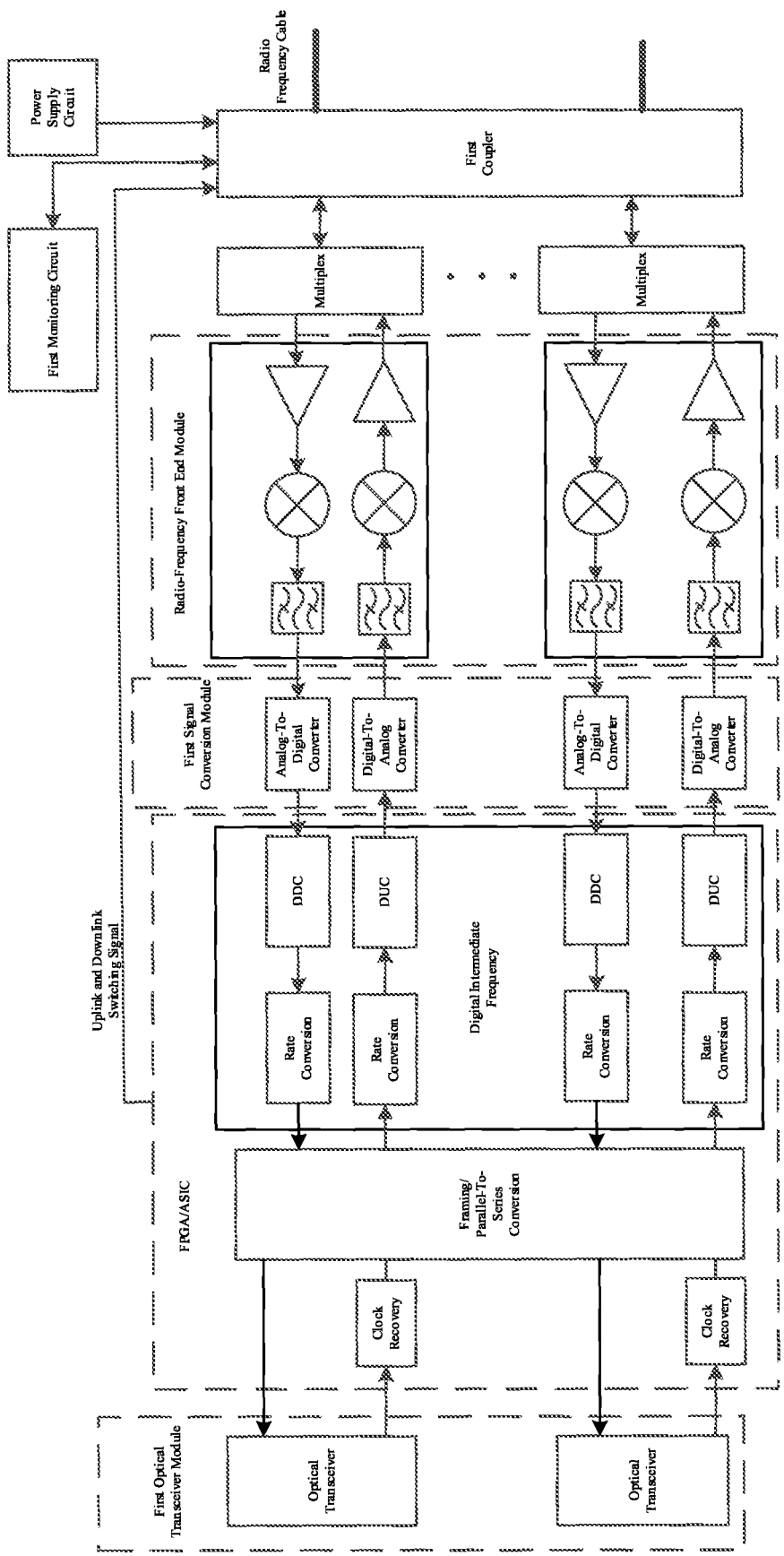
FIG. 11 is a second schematic structural diagram illustrating the digital-analog expansion unit of the distributed antenna system according to an embodiment.

Exemplarily, as shown in FIG. 11, the digital-analog expansion unit further includes a first monitoring circuit, a power supply circuit and a first coupler that is connected to the first remote unit of the remote cascade chain by means of radio frequency cable.

The first coupler is connected to the first baseband processing module, the radio frequency front end module, the first monitoring circuit and the power supply circuit. The first coupler is configured to perform at least one of operations including: coupling uplink and downlink switching signals generated by the first baseband processing module to the radio frequency cable, coupling a power signal to the radio frequency cable, performing monitoring signal interaction with the remote unit, and performing analog radio frequency signal interaction with the remote unit.

Specifically, the digital-analog expansion unit further includes a first coupler connected between the radio frequency front end module and the remote cascade chain, and a first monitoring circuit and a power supply circuit both of which are connected to the first coupler. The first monitoring circuit is configured to generate and process a monitoring signal, which may monitor state information, device information, alarm information and the like of each remote unit by coupling the monitoring signal to the radio frequency cable through the first coupler. Optionally, the first monitoring circuit may be a circuit generating and processing a low-speed radio frequency signal. The low-speed radio frequency signal may be a bluetooth signal, a frequency-shift keying (FSK) signal or the like. The low-speed radio frequency signal does not interfere with other signals on the radio frequency cable. For example, the first monitoring circuit may include a first processor and a first bluetooth chip connected between the first processor and the first coupler.

The power supply circuit is configured to generate a power signal and couple it to the radio frequency cable through the first coupler to provide a power signal for each remote unit, so as to facilitate the remote unit to amplify the radio frequency signal. The first baseband processing module may be further configured to generate uplink and downlink switching signals which are coupled to the radio frequency cable through the first coupler, thereby driving the remote unit to realize time division duplexing (TDD) coverage. The first coupler is configured to couple the downlink analog radio frequency signal, the uplink and downlink switching signals, the power signal, the monitoring signal and the like to the radio frequency cable, to facilitate the remote units in the remote cascade chain to couple out corresponding signals in the radio frequency cable. The first coupler is further configured to obtain the uplink analog radio frequency signal, the monitoring signal and the like by coupling from the radio frequency cable. It is to be noted that the radio frequency front end module may be in a zero intermediate frequency, superheterodyne, direct radio frequency sampling mode or the like. The monitoring signal and the power signal, when coupled to the radio frequency cable through the first coupler, may be coupled to one radio frequency cable or a plurality of radio frequency cables, to ensure that the power signals and the monitoring signal are fed into each remote unit.

In the embodiment of the present application, the digital-analog expansion unit may couple a plurality of signals to the radio frequency cable through the coupler, which facilitates each remote unit to acquire the signal, enriching the functionality of the remote unit and reducing the system's demand for the transmission medium.

Exemplarily, a digital-analog mixed expansion unit mainly includes a multiplexer (or a duplexer), a coupler, a radio frequency front end, baseband processing, a digital-to-analog/analog-to-digital converter and an optical transceiver. For a 1T1R system, only one radio frequency cable is required for transmission. For an MIMO system, multiple radio frequency cables are required, or MIMO signals in a same frequency band are converted and then transmitted on a same cable. The digital-analog mixed expansion unit includes at least two optical transceivers, of which one is connected to the source unit or an upper-stage digital-analog mixed expansion unit and the other is connected to another digital-analog expansion unit. Baseband processing is realized by an FPGA or an ASIC with a same function.

For a downlink, baseband processing of the current digital-analog expansion unit involves acquiring a digital radio frequency signal from the source unit or the upper-stage digital-analog expansion unit through the optical transceiver, which, after processing such as clock recovery, series-to-parallel conversion, deframing, rate conversion and digital up conversion, is transmitted to the digital-to-analog converter to be converted into an analog radio frequency signal, transmitted to the radio frequency front end module, after processing such as filtering, frequency conversion, and amplification, transmitted to the multiplexer, coupled through the first coupler and then fed into the radio frequency cable.

For an uplink, the first coupler obtains the analog radio frequency signal by coupling from the radio frequency cable, which is filtered by the multiplexer and then enters the radio frequency front end for amplification, filtering and frequency conversion. The radio frequency signal processed by the radio frequency front end is converted into a digital radio frequency signal through the analog-to-digital converter, which is photoelectrically converted after baseband processing such as digital down conversion (DDC), rate conversion, framing, and parallel-to-series conversion, converted into an optical signal and then transmitted to the upper-stage digital-analog expansion unit or the source unit.

If the signal is of a TDD standard, the remote unit is required to recover an uplink and downlink switching switch to switch uplink and downlink signals. If the remote unit cannot acquire a signal indicative of switch recovery from the radio frequency signal, the digital-analog expansion unit is required to directly provide uplink and downlink switching signals by means of the radio frequency cable.

Figure 12:
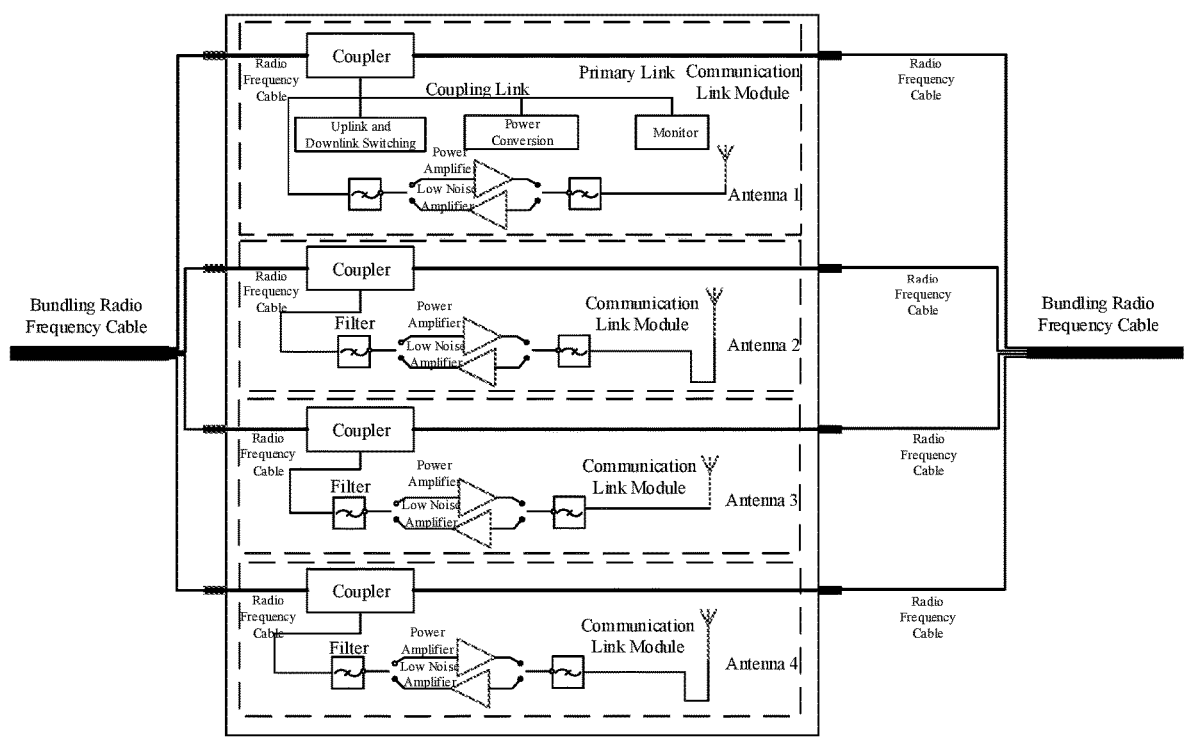
FIG. 12 is a first schematic structural diagram illustrating the remote unit of the distributed antenna system according to an embodiment.

Exemplarily, as shown in FIG. 12, the remote unit includes at least one communication link module. Two adjacent remote units are connected through a plurality of radio frequency cables, and may be preferably connected through a bundling cable. The bundling radio frequency cable includes at least one radio frequency cable, and one radio frequency cable is correspondingly connected to one communication link module of a lower-stage remote unit.

Specifically, according to the number of communication channels configured for communication, the remote unit may be provided with a plurality of communication link modules configured to couple and process analog radio frequency signals of the corresponding communication channels from the radio frequency cable. At the same time, the radio frequency cable in the system may be correspondingly set to a bundling radio frequency cable including a plurality of radio frequency cables. One communication link module is connected to one communication link module of the lower-stage remote unit by means of one radio frequency cable or connected to the digital-analog expansion unit by means of one radio frequency cable. For example, in a communication system supporting 4T4R, the remote unit may include four communication link modules, and the bundling radio frequency cable includes four radio frequency cables each of which is configured to realize 1T1R antenna radio frequency transmission. The radio frequency cables in the bundling radio frequency cable may be connected to the communication link modules in the remote unit in a one-to-one correspondence manner, thereby meeting radio frequency transmission of 4T4R. Specifically, the communication link module may mainly include a coupler, a filter, a DC isolation circuit, an amplifier, an antenna and the like, which is not specifically limited herein. It is to be noted that a plurality of signals in different frequency bands may be transmitted on a same radio frequency cable, but uplink and downlink may be separated or combined by the multiplexer, so that coverage may be performed on different antennas.

Figure 13:
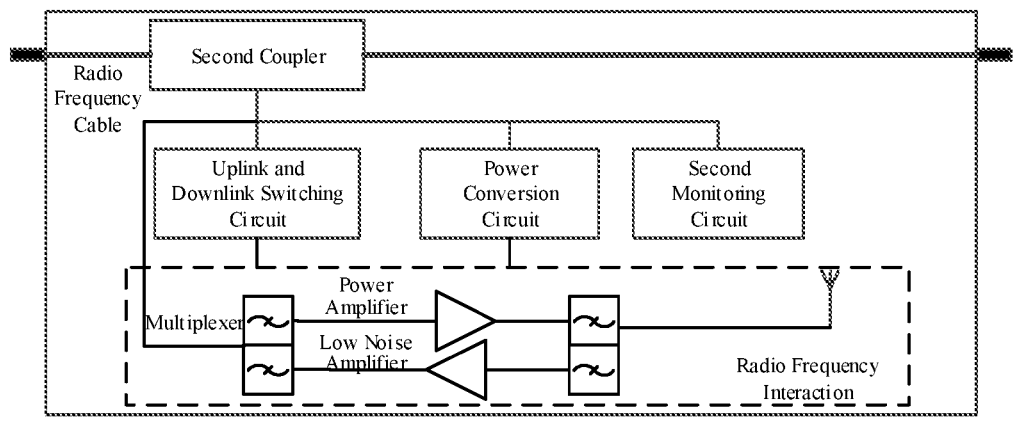
FIG. 13 is a second schematic structural diagram illustrating the remote unit of the distributed antenna system according to an embodiment.

Exemplarily, as shown in FIG. 13, the communication link module includes a second coupler, a radio frequency interaction circuit, a second monitoring circuit, a power conversion circuit and an uplink and downlink switching circuit. The second coupler is connected to the first coupler or a communication link module of an upper-stage remote unit by means of radio frequency cable. The second coupler is connected to the radio frequency interaction circuit, the second monitoring circuit, the power conversion circuit and the uplink and downlink switching circuit. The radio frequency interaction circuit is connected to the power conversion circuit and the uplink and downlink switching circuit.

The second coupler is configured to perform at least one of operations including: acquiring a power signal, acquiring an uplink and downlink switching signal, performing monitoring signal interaction with the digital-analog expansion unit, performing analog radio frequency signal interaction with the digital-analog expansion unit, and performing analog radio frequency signal interaction with the lower-stage remote unit.

Specifically, the communication link module includes a second coupler connected to the radio frequency cable and configured to perform analog radio frequency signal transmission with the first coupler, the communication link module of the upper-stage remote unit or the communication link module of the lower-stage remote unit. Specifically, the second coupler has a first port connected to the first coupler or the communication link module of the upper-stage remote unit by means of radio frequency cable, a second port connected to the communication link module of the lower-stage remote unit, and a third port connected to the radio frequency interaction circuit, the second monitoring circuit, the power conversion circuit and the uplink and downlink switching circuit in the communication link module.

It is to be noted that the radio frequency interaction circuit is configured to perform radio frequency signal interaction with an external terminal, and may include devices such as a filter, an amplifier and an antenna. Specifically, the radio frequency interaction circuit may obtain an analog radio frequency signal from the radio frequency cable through the second coupler, which is transmitted out by the antenna after processing such as filtering and amplification. The radio frequency interaction circuit may also acquire an analog radio frequency signal transmitted by the external terminal through the antenna, which, after processing such as filtering and amplification, is coupled to the radio frequency cable through the second coupler and is then transmitted to the digital-analog expansion unit.

The second monitoring circuit may be configured to acquire a monitoring signal through the second coupler and perform processing, and may further feed back a monitoring signal through the second coupler, to realize monitoring signal interaction between the remote unit and the digital-analog expansion unit. Specifically, the second monitoring circuit may be a circuit generating and processing a low-speed radio frequency signal, such as a bluetooth signal or an FSK signal. The second monitoring circuit may feed back state information, device information, alarm information or the like of a current remote unit through the monitoring signal. For example, the second monitoring circuit may include a second processor and a second bluetooth chip connected between the second processor and the second coupler. The second processor may be connected to an attenuator of the radio frequency interaction circuit to control an attenuation value in the radio frequency interaction circuit.

The power conversion circuit may be configured to acquire a power signal through the second coupler, and convert the power signal to obtain a standard power supply required by each device in the remote unit, thereby meeting active amplification of the radio frequency interaction circuit. Specifically, a coupling voltage on the radio frequency cable is generally 48 V (volts) and is required to be converted into 5 V, 3.3 V or the like. The uplink and downlink switching circuit may be configured to acquire uplink and downlink switching signals through the second coupler, and control uplink and downlink switching of the radio frequency interaction circuit, so as to realize coverage of TDD-standard signals. Optionally, the uplink and downlink switching signals may also be directly extracted from the analog radio frequency signal.

The remote unit in the embodiment of the present application may obtain the downlink analog radio frequency signal, the monitoring signal, the power signal and the like by coupling from the radio frequency cable through the coupler, to realize signal coverage. Moreover, the device has a simple structure and low costs, and facilitates expansion of the system.

Exemplarily, the remote unit is further configured to: acquire a first uplink analog radio frequency signal of the terminal and a second uplink analog radio frequency signal transmitted by a lower-stage remote unit, and combine the first uplink analog radio frequency signal with the second uplink analog radio frequency signal to obtain an uplink analog radio frequency signal of a current remote unit; and transmit the uplink analog radio frequency signal to an upper-stage remote unit or the digital-analog expansion unit.

Specifically, for an uplink, in the remote cascade chain, the current remote unit acquires the uplink analog radio frequency signal of the external terminal through radio frequency interaction. At the same time, the current remote unit further acquires the uplink analog radio frequency signal transmitted by the lower-stage remote unit, combines the acquired uplink analog radio frequency signals, and transmits the combined uplink analog radio frequency signal to the upper-stage remote unit or the digital-analog expansion unit, to realize transmission of uplink radio frequency signals.

Optionally, the distributed antenna system further includes the source unit connected to the digital-analog expansion unit.

The source unit is a BBU or an RRU. If the source unit is the RRU, the distributed antenna system further includes an access unit connected between the RRU and the digital-analog expansion unit. The access unit is configured to perform a baseband processing operation on a received external signal through a second baseband processing module inside the access unit, and to perform interconversion of an analog radio frequency signal and a digital radio frequency signal through a second signal conversion module inside the access unit, to obtain a third uplink analog radio frequency signal to be transmitted to the RRU or a downlink digital radio frequency signal to be transmitted to the digital-analog expansion unit.

Specifically, the source unit may be a BBU, which can directly process a baseband signal and is configured to add received digital radio frequency signals having a same signal feature (a same standard, a same frequency band or a same cell). The signal obtained by addition is demodulated and decoded or undergoes other baseband signal processing in the source unit. If they are signals with different signal features, they are allocated to different baseband units for baseband signal processing. The source unit may also be an RRU. In this case, the access unit is required to convert an analog radio frequency signal of the RRU into a digital radio frequency signal and transmit it to the digital-analog expansion unit through an optical fiber. Moreover, the access unit further converts the digital radio frequency signal of the digital-analog expansion unit into an analog radio frequency signal and transmits it to the RRU. In addition, the access unit is further configured to perform a baseband processing operation on various external signals, for example, deframe, digitally combine, frame and perform digital intermediate frequency processing on the digital radio frequency signal. On this basis, the access unit can deframe, combine and convert the signals transmitted by a plurality of digital-analog expansion units and then transmit, through the corresponding radio frequency cables, a plurality of analog radio frequency signals obtained to the RRU for processing. At the same time, the access unit may also convert, perform intermediate frequency processing on and frame a plurality of analog radio frequency signals transmitted by the RRU and then transmit them to the digital-analog expansion units through optical ports.

Figure 14:
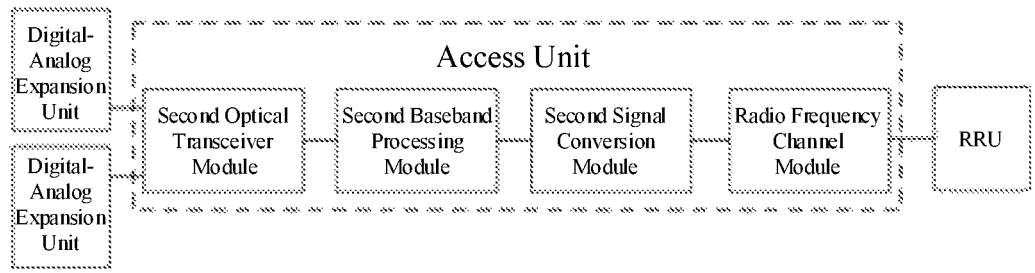
FIG. 14 is a first schematic structural diagram illustrating an access unit of the distributed antenna system according to an embodiment.

Exemplarily, as shown in FIG. 14, the access unit includes a second optical transceiver module, a second baseband processing module, a second signal conversion module and a radio frequency channel module successively connected. The second optical transceiver module is configured to perform optical signal interaction with the digital-analog expansion unit. The second baseband processing module is configured to perform baseband processing on a received signal and then output the signal. The second signal conversion module is configured to perform digital radio frequency signal interaction with the second baseband processing module and perform analog radio frequency signal interaction with the radio frequency channel module. The radio frequency channel module is configured to perform analog radio frequency signal interaction with the RRU and configured to perform analog radio frequency signal processing.

On this basis, in the embodiment of the present application, the digital-analog expansion unit and the remote units use a cable connection-based daisy chain topology, which can both increase transmission bandwidth and effectively decrease transmission link costs. In addition, baseband processing being executed by the digital-analog expansion unit, and a remote unit not requiring baseband processing equipment, can effectively lower system component costs and operating power consumption. At the same time, coverage of the remote unit is not limited by bandwidth and the remote unit supports a plurality of signal access coverage. The present system is characterized by multi-mode, multi-band support and cell splitting, is easy to expand, and has low construction difficulty.

In an embodiment, a signal transmission method is provided. The signal transmission method is applicable to the distributed antenna system described above, and includes the following steps.

The remote unit acquires a first uplink analog radio frequency signal of a terminal and a second uplink analog radio frequency signal transmitted by a lower-stage remote unit.

The remote unit combines the first uplink analog radio frequency signal with the second uplink analog radio frequency signal to obtain an uplink analog radio frequency signal of a current remote unit, and transmits the uplink analog radio frequency signal of the current remote unit to an upper-stage remote unit or the digital-analog expansion unit.

The digital-analog expansion unit performs analog-to-digital conversion and baseband processing on the acquired uplink analog radio frequency signal, to obtain an uplink digital radio frequency signal to be transmitted to the source unit through an optical fiber.

In an embodiment, a signal transmission method is further provided. The signal transmission method is applicable to the distributed antenna system described above, and includes the following steps.

The digital-analog expansion unit performs baseband processing and digital-to-analog conversion on a downlink digital radio frequency signal transmitted by a source unit through an optical fiber, to obtain a downlink analog radio frequency signal, and transmits the downlink analog radio frequency signal to the remote cascade chain.

The remote unit acquires the downlink analog radio frequency signal, and performs downlink radio frequency signal transmission based on the downlink analog radio frequency signal.

Optionally, in the distributed antenna system, at least two digital-analog expansion units are provided. Two adjacent ones of the digital-analog expansion units are cascaded by optical fibers through respective optical transceiver modules, and a first digital-analog expansion unit is connected to the source unit through an optical fiber. The signal transmission method may further include the following steps.

The digital-analog expansion unit determines, according to whether features of multi-channel signals received by a current digital-analog expansion unit are the same, whether to digitally combine the received multi-channel signals.

If a signal feature of a first uplink digital radio frequency signal is the same as that of a second uplink digital radio frequency signal, the digital-analog expansion unit digitally combines the first uplink digital radio frequency signal with the second uplink digital radio frequency signal to obtain a third uplink digital radio frequency signal of a current digital-analog expansion unit, converts the third uplink digital radio frequency signal to obtain an uplink optical signal of the current digital-analog expansion unit, and transmits the uplink optical signal to an upper-stage digital-analog expansion unit or the source unit. The first uplink digital radio frequency signal is obtained by processing the uplink optical signal of a lower-stage digital-analog expansion unit by the current digital-analog expansion unit. The second uplink digital radio frequency signal is obtained by performing analog-to-digital conversion and baseband processing on the uplink analog radio frequency signal of the remote cascade chain connected to the current digital-analog expansion unit by the current digital-analog expansion unit.

If the signal feature of the first uplink digital radio frequency signal is different from that of the second uplink digital radio frequency signal, the digital-analog expansion unit converts the first uplink digital radio frequency signal and the second uplink digital radio frequency signal respectively to obtain corresponding uplink optical signals, and transmits the uplink optical signals to the upper-stage digital-analog expansion unit or the source unit.

The digital-analog expansion unit frames a downlink digital radio frequency signal transmitted by the source unit, and transmits the framed digital radio frequency signal transparently to a lower-stage digital-analog expansion unit through an optical fiber.

Specific limitations on the signal transmission method may be obtained with reference to the limitations on the distributed antenna system hereinabove, which are not described in detail herein.

Exemplarily, a 4T4R antenna is mainly used for 5G indoor distribution, the 4T4R antenna has a bandwidth of at least 100 MHz, for example, a bandwidth of 160 MHz for 2.6 G frequency band, a bandwidth of 200 MHz for 3.5 G frequency band, and both the 2.6 G and 3.5 G frequency bands are TDD signals. For example, according to the 4T4R/100 MHz bandwidth, the communication system may include one source unit, four digital-analog expansion units and thirty-two remote units. The source unit may be a BBU, or may mainly include an RRU and an access module. Each base station unit, that is, source unit, is connected to four digital-analog expansion units. Each digital-analog expansion unit is connected to eight remote units.

Specifically, to meet communication requirements of 4T4R, all cables on 4T4R communication links are bundling cables including four subcables, each of which is configured to realize 1T1R antenna radio frequency transmission. The configuration of the remote unit is as shown in FIG. 12, including four communication link modules corresponding to the subcables respectively. In other words, each subcable in the bundling cable may be correspondingly connected to one coupler when connected to the remote unit. On this basis, the remote unit may couple signals in the subcables. At the same time, the signal in the cable passing through the coupler has relatively low power insertion loss, and may be transmitted to the lower-stage remote unit through the cable. A downlink radio frequency signal is coupled out of the coupler, then passes through a filter (a TDD signal is a filter), is amplified by a power amplifier, and is then filtered and transmitted from the antenna. An uplink radio frequency signal is received from the antenna, filtered by the filter, amplified by a low noise amplifier, filtered by the filter, and coupled from the coupler to the bundling cable.

Figure 15:
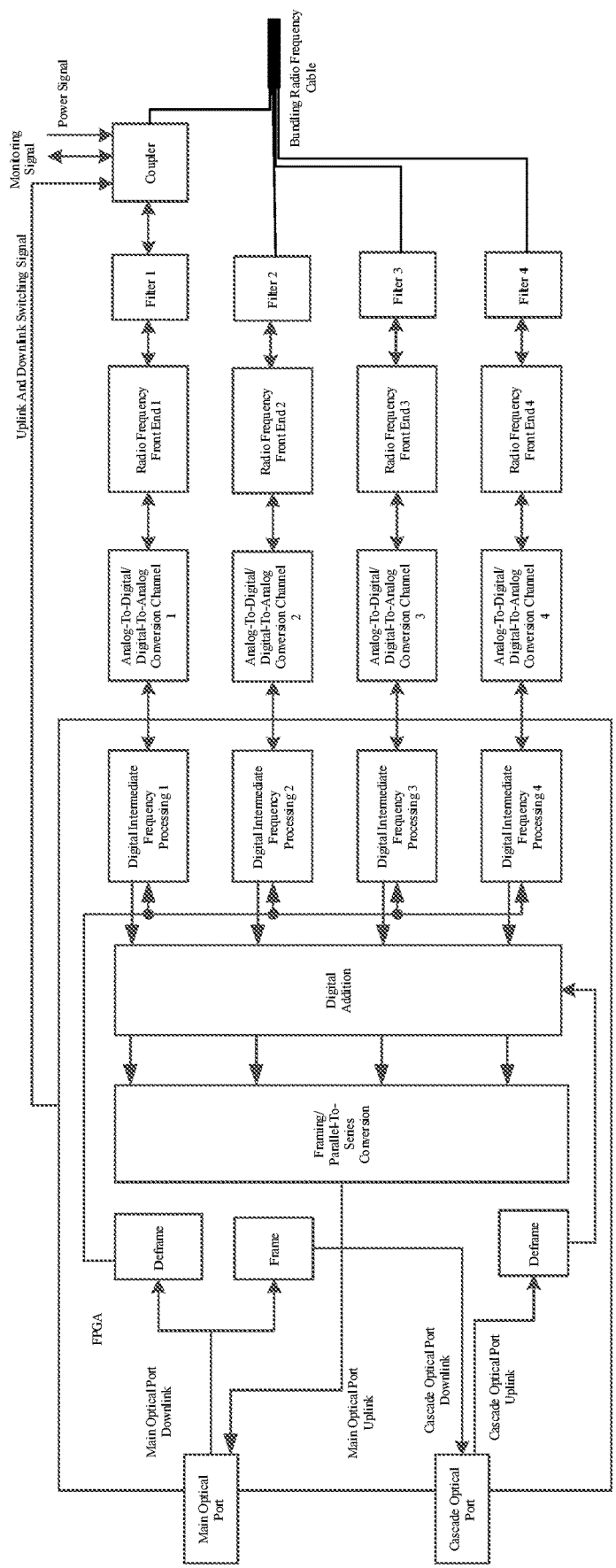
FIG. 15 is a third schematic structural diagram illustrating the digital-analog expansion unit of the distributed antenna system according to an embodiment.
Figure 16:
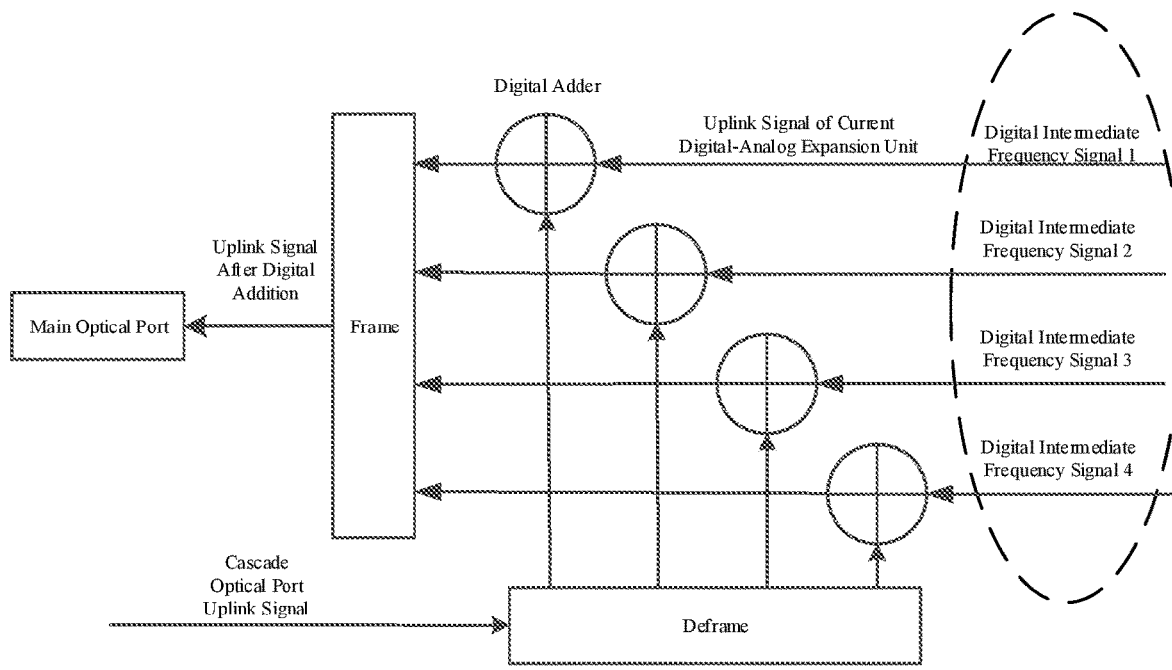
FIG. 16 is a schematic diagram illustrating digital combination performed by the distributed antenna system according to an embodiment.

The digital-analog expansion unit may be as shown in FIG. 15, including two optical ports, of which one is a main optical port configured to connect the upper-stage digital-analog expansion unit or the source unit, and the other is a cascade optical port configured to connect the lower-stage digital-analog expansion unit. A downlink signal of the main optical port is transmitted by broadcast, and is divided into two channels after entering the FPGA. One channel, after deframing, is divided into four downlink signals corresponding to four antennas respectively, which enter corresponding digital intermediate frequency modules for Digital Up Conversion (DUC), digital filtering and other processing, undergo digital-to-analog conversion and radio frequency front end processing, and are then transmitted to the corresponding cables and to the remote cascade chain. The other channel passes through a framing module, and after addition of some control information, is transmitted transparently to the cascade optical port. Four uplink signals undergo corresponding radio frequency front end processing from the remote unit through the bundling cable, are then converted into digital signals after analog-to-digital conversion, enter the FPGA, and in the FPGA, first pass through the digital intermediate frequency module and then enter a digital adding module after DDC and digital filtering. As shown in FIG. 16, uplink signals of the digital adding module and the cascade optical port are digitally added (digitally combined). Only signals from same antennas and radio frequency channels can be combined.

Figure 17:
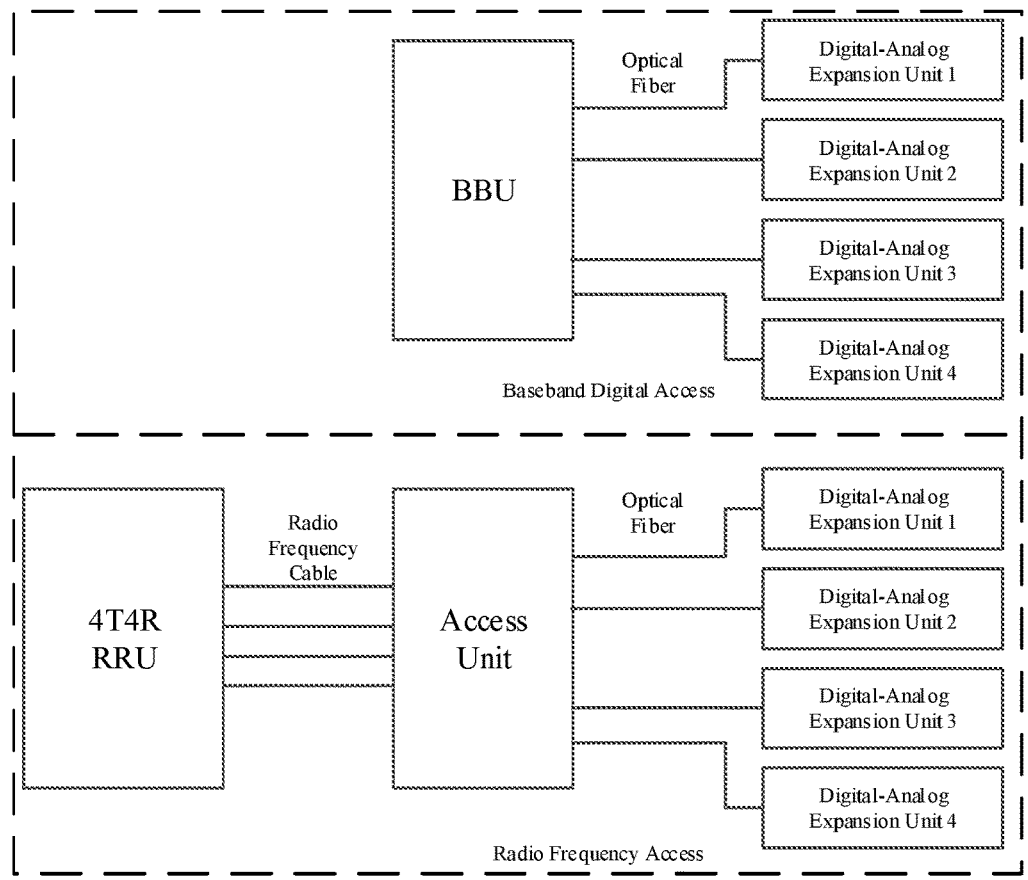
FIG. 17 is a comparison diagram illustrating a source unit of the distributed antenna system according to an embodiment.
Figure 18:
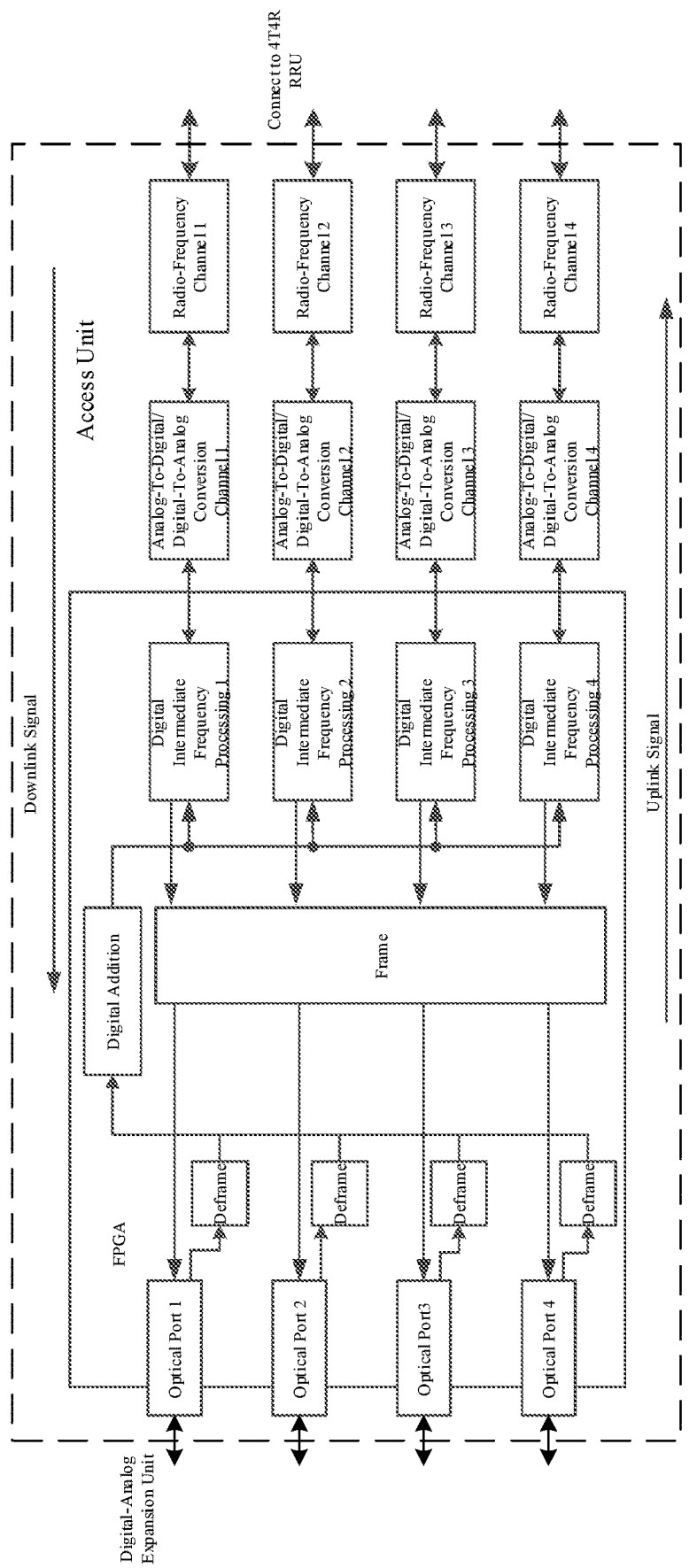
FIG. 18 is a second schematic structural diagram illustrating the access unit of the distributed antenna system according to an embodiment.

The source unit may be directly a BBU configured to directly demodulate, decode, or perform other baseband signal processing on the digital radio frequency signal transmitted by the digital-analog expansion unit, as shown in FIG. 17. The source unit may also be an RRU, and the system further includes an access unit connected between the RRU and the digital-analog expansion unit, as shown in FIG. 17. The access unit may be configured for conversion between radio frequency and digital, perform digital radio frequency signal interaction with the digital-analog expansion unit, and perform analog radio frequency signal interaction with the RRU. As shown in FIG. 18, the access unit may be provided with 4 optical ports (which may also be other numbers). In the case of uplink, signals transmitted by the digital-analog expansion units are combined digitally according to same signal features, that is, Optical Port 1 Channel 1+Optical Port 2 Channel 1+Optical Port 3 Channel 1+Optical Port 4 Channel 1=Total Channel 1 signal.

By analogy, total signals of channels 2, 3 and 4 are obtained, then transmitted to corresponding signal intermediate frequency processing links for processing, and finally converted into analog radio frequency signals and transmitted to the corresponding ports of the RRU of 4T4R. In the case of downlink, four downlink signals are fed into the access module from the ports of the RRU, undergo corresponding radio frequency channel processing, analog-to-digital conversion, and signal intermediate frequency processing, and are then framed. A signal obtained by framing is broadcast to each optical port. That is, a downlink signal of each optical portion may include signals of the channels 1, 2, 3 and 4.

During transmission between the source unit and the digital-analog expansion unit as well as transmission between the digital-analog expansion units, if a 4T4R/100 MHz bandwidth signal is transmitted using a standard CPRI, a transmission rate of 19.6 GBps and an optical transceiver module of 25 G are required. In this case, transmission costs and device costs may be increased greatly. In the embodiment of the present application, transmission may be performed by CPRI compression and using a non-standard CPRI:

$$122.88 \text{ MHz} \times 2 \times 9 \times 16/15 \times 66/64 \times 4 = 9.732 \text{ Gbps} < 10 \text{ Gbps},$$

where 122.88 MHz denotes a transmission rate of a 100 MHz bandwidth signal, 2 denotes IQ channels, 15 denotes a transmission bit width, 16/15 denotes a transmission control overhead, 10/8 denotes transmission code, and 4 denotes a number of antennas. In this case, the transmission rate is less than 10 Gbps, and an optical module of 10 G and an FPGA may be used, thereby reducing the costs greatly.

Figure 19:
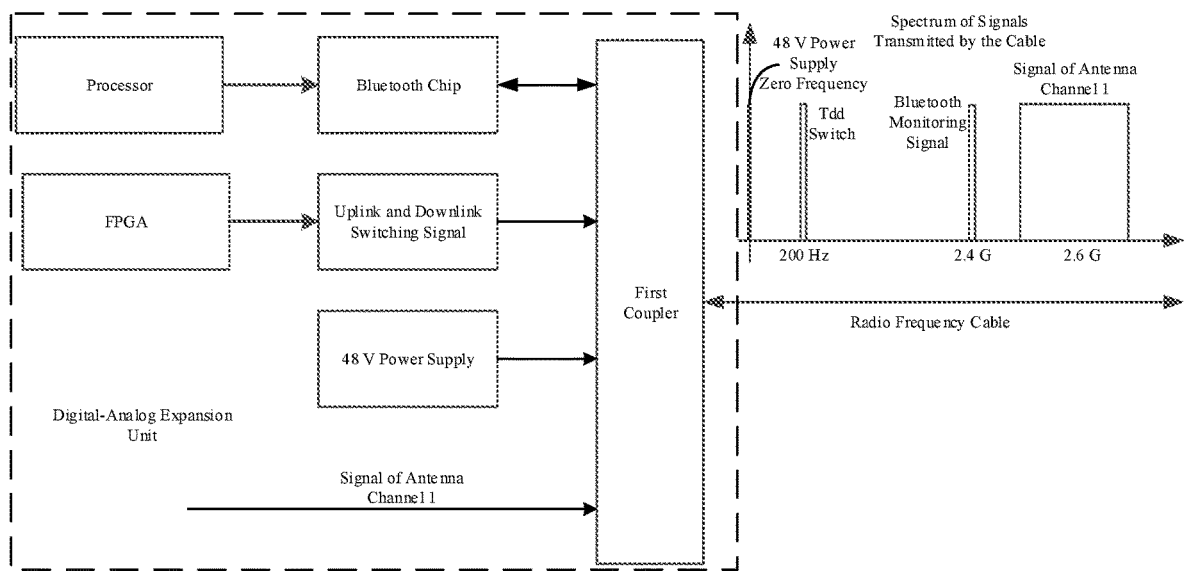
FIG. 19 is a schematic diagram illustrating signal coupling of the digital-analog expansion unit of the distributed antenna system according to an embodiment.

It is to be noted that, as shown in FIG. 19, the digital-analog expansion unit in the embodiment of the present application may feed, on a cable, in a power signal, a TDD switch switching signal and a monitoring signal matching the remote unit. The monitoring signal may be transmitted using a bluetooth signal or using an FSK or other low-speed radio frequency signals, provided that a selected frequency band does not interfere with other signals. For example, a bluetooth frequency band is 2.4 G, which is not in a same frequency band as 2.6 G of a coverage signal. The power supply may normally be a 48-V power supply. The power signal is coupled to the cable by a coupler or combiner with DC coupling for transmission. The TDD switch switching signal may also be directly coupled to the radio frequency cable.

Figure 20:
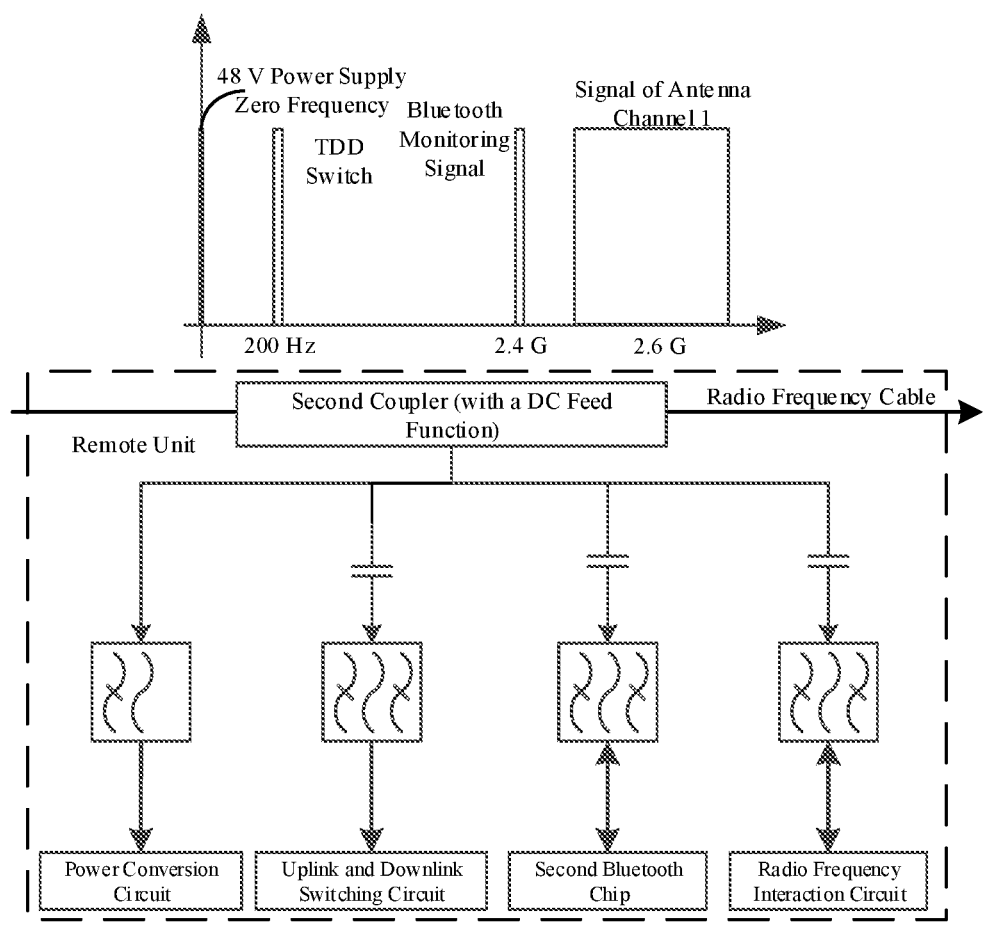
FIG. 20 is a schematic diagram illustrating signal coupling of the remote unit of the distributed antenna system according to an embodiment.

Since all the signals are in the cable, for the remote unit, its signal extraction may be shown in FIG. 20. Coupled through the coupler, a DC power signal passes through a low-pass filter, which filters out a high-frequency signal, and is transmitted to the power conversion circuit to obtain a power supply required by operation of the remote unit. A TDD switch switching circuit may isolate the DC power signal through a DC isolation circuit, which passes through a bandpass filter to obtain a switching signal for uplink and downlink signal switching. The bluetooth chip may be configured to transmit the monitoring signal, which passes through the DC isolation circuit to isolate a DC power signal, and to receive the monitoring signal transmitted by the digital-analog expansion unit after the monitoring signal passes through the bandpass filter. At the same time, an MCU of the remote unit may also feed the monitoring signal back to the digital-analog expansion unit through the bluetooth chip to realize two-way communication. The downlink radio frequency signal finally covered is also required to be transmitted by the antenna after passing through the DC isolation circuit and the filter.

Figure 21:
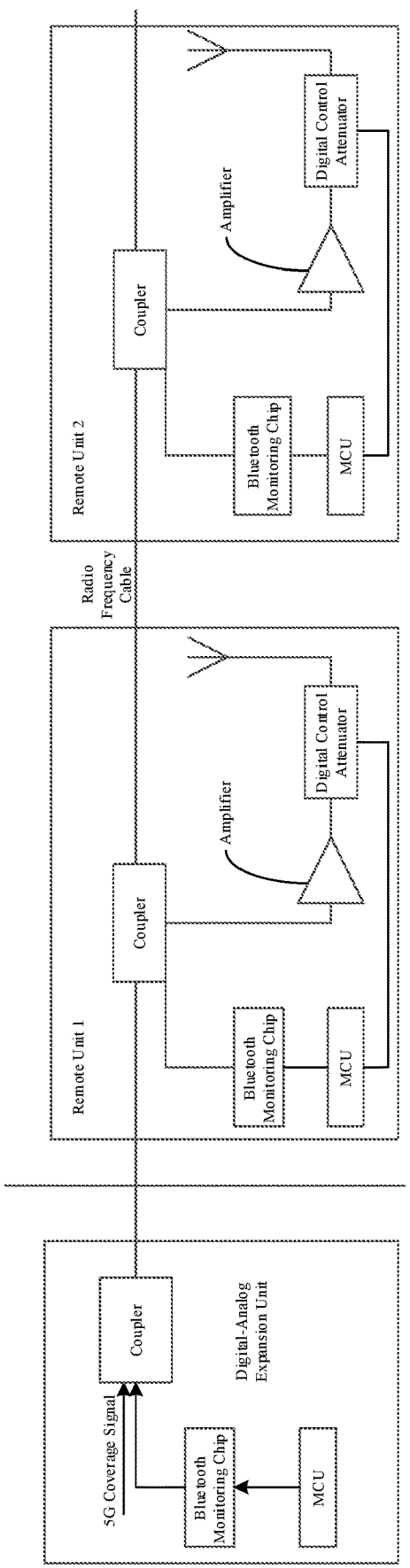
FIG. 21 is a fourth schematic structural diagram illustrating the distributed antenna system according to an embodiment.

Further, since the remote unit uses the radio frequency cable for analog radio frequency signal transmission, the radio frequency cable may cause a signal insertion loss. At the same time, in the embodiment of the present application, the use of the daisy chain cascading mode leads to inconsistent lengths of radio frequency cables between the remote units and the digital-analog expansion units on a same daisy chain (that is, the remote cascade chain), as shown in FIG. 21. The remote unit may amplify the signal through the amplifier to compensate for a cable insertion loss. At the same time, gains of different remote units are controlled by arranging a digital control attenuator, and the corresponding insertion loss may be matched. A specific process may be as follows.

When a remote unit is connected to the digital-analog expansion unit, a Microcontroller Unit (MCU) of the remote unit first establishes a monitoring channel connection with an MCU of the digital-analog expansion unit through the bluetooth chip. The digital-analog expansion unit transmits a bluetooth signal at a fixed power Pt_bluetooth to the cable, which is assumed to be 0 dBm. Each remote unit may receive the bluetooth signal, and measure received power Pr_bluetooth. Due to inconsistent lengths of the radio frequency cables, power values received by the remote units are also inconsistent. According to the measured power value, the remote unit may calculate signal insertion loss Ploss between the remote unit and the digital-analog expansion unit, for example, $$Ploss = Pt\_bluetooth - Pr\_bluetooth.$$

After the insertion loss Ploss is obtained, a cable length may be obtained according to insertion loss characteristics (corresponding to the 2.4 G frequency band of the bluetooth signal) of the cable. Then, an insertion loss value required to cover a signal frequency band (such as mobile 2.6 G) is obtained according to the cable length, and then matching may be performed by adjusting the digital control attenuator.

For example, the insertion loss value for 2.6 G is calculated to be 30 dB, and a downlink amplification gain of the remote unit is 50 dB. In this case, setting an attenuation value of 20 dB may realize the matching between a remote gain and line insertion loss.

In another example, output power of the remote unit is greater than that of the digital-analog expansion unit, so the set amount of attenuation is required to be reduced. For example, signal output power of the digital-analog expansion unit is 15 dBm, the cable loss is 30 dBm, the power to be output by the remote unit is 23 dBm, and the maximum gain of the remote unit is still 50 dBm, so the attenuation value is: 23−(15−30+50)=12 dB. That is, the attenuation value is required to be set to 12 dB, not 20 dB.

In an embodiment, a gain control method is provided. The gain control method is applicable to the distributed antenna system described above. The gain control method includes the following steps.

The remote unit acquires a radio frequency signal transmitted by the digital-analog expansion unit by means of radio frequency cable, and measures the radio frequency signal, to obtain a first power value. The radio frequency signal is a signal generated by the digital-analog expansion unit according to a preset frequency band and a preset power value.

The remote unit obtains a radio frequency signal insertion loss based on the first power value and the preset power value, and obtains a cable length according to the radio frequency signal insertion loss and the preset frequency band.

The remote unit obtains a target signal insertion loss based on the cable length and a target signal frequency band, and matches an attenuation value of a digital control attenuator based on the target signal insertion loss, target transmitting power and a gain value.

Specifically, the digital-analog expansion unit generates a corresponding signal according to a set frequency band and a set power value and couples it to the radio frequency cable. After obtaining the signal by coupling from the radio frequency cable, the remote unit measures a current power value of the signal. Then, a length of the radio frequency cable between the remote unit and the digital-analog expansion unit may be calculated according to the current power value, the set power value and frequency band. The remote unit may obtain, according to the cable length and a frequency band of the signal covered by the remote unit, an insertion loss generated by the frequency band on the radio frequency cable. Then, the attenuation value of the digital control attenuator is adjusted according to the insertion loss, the gain value of the amplifier and the power value required for signal coverage, to realize gain control over the remote unit. It is to be noted that the radio frequency signal may be a bluetooth signal, an FSK signal or other low-speed radio frequency signals, which may be selected according to a signal frequency band requirement and is not specifically limited herein.

On this basis, the embodiment of the present application can not only reduce construction costs of the system, but also complete measurement of the length of the radio frequency cable through the signal interaction between the remote unit and the digital-analog expansion unit, thereby adapting to the attenuation value inside the remote unit to realize signal coverage of a target power and ensure communication quality of the system.

In an embodiment, a gain control apparatus applied to a distributed antenna system is provided. The gain control apparatus is arranged in each of the remote units.

The gain control apparatus includes:
  a power measurement module configured to acquire a radio frequency signal transmitted by the digital-analog expansion unit by means of radio frequency cable, and measure the radio frequency signal, to obtain a first power value, the radio frequency signal being a signal generated by the digital-analog expansion unit according to a preset frequency band and a preset power value;
  a cable length acquisition module configured to obtain a radio frequency signal insertion loss based on the first power value and the preset power value, and obtain a cable length according to the radio frequency signal insertion loss and the preset frequency band; and
  an attenuation value matching module configured to obtain a target signal insertion loss based on the cable length and a target signal frequency band, and match an attenuation value of a digital control attenuator based on the target signal insertion loss, target transmitting power and a gain value.

Specific limitations on the gain control apparatus may be obtained with reference to the limitations on the gain control method hereinabove, which are not described in detail herein. Each module in the gain control apparatus may be entirely or partially implemented by using software, hardware, or a combination thereof. The above modules may be built in or independent of a processor of a computer device in a hardware form, or may be stored in a memory of the computer device in a software form, so that the processor invokes and performs an operation corresponding to each of the above modules.

In an embodiment, a computer device is provided, including a memory and a processor. The memory stores a computer program. The processor, when executing the computer program, performs the following steps:
  acquiring a radio frequency signal transmitted by the digital-analog expansion unit by means of radio frequency cable, and measuring the radio frequency signal, to obtain a first power value, the radio frequency signal being a signal generated by the digital-analog expansion unit according to a preset frequency band and a preset power value;
  obtaining a radio frequency signal insertion loss based on the first power value and the preset power value, and obtaining a cable length according to the radio frequency signal insertion loss and the preset frequency band; and
  obtaining a target signal insertion loss based on the cable length and a target signal frequency band, and matching an attenuation value of a digital control attenuator based on the target signal insertion loss, target transmitting power and a gain value.

Specific limitations on the computer device may be obtained with reference to the limitations on the gain control method hereinabove, which are not described in detail herein.

In an embodiment, a computer-readable storage medium is provided, having a computer program stored thereon. When the computer program is executed by a processor, the following steps are performed:
  acquiring a radio frequency signal transmitted by the digital-analog expansion unit by means of radio frequency cable, and measuring the radio frequency signal, to obtain a first power value, the radio frequency signal being a signal generated by the digital-analog expansion unit according to a preset frequency band and a preset power value;
  obtaining a radio frequency signal insertion loss based on the first power value and the preset power value, and obtaining a cable length according to the radio frequency signal insertion loss and the preset frequency band; and
  obtaining a target signal insertion loss based on the cable length and a target signal frequency band, and matching an attenuation value of a digital control attenuator based on the target signal insertion loss, target transmitting power and a gain value.

Specific limitations on the computer-readable storage medium may be obtained with reference to the limitations on the gain control method hereinabove, which are not described in detail herein.

Those of ordinary skill in the art may understand that some or all procedures in the methods in the above embodiments may be implemented by a computer-readable instruction instructing related hardware, the program may be stored in a non-volatile computer-readable storage medium, and when the program is executed, the procedures in the above method embodiments may be implemented. Any reference to a memory, a storage, a database, or other media used in the embodiments provided in the present application may include at least one of a non-volatile memory and a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache memory. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a Sync link DRAM (SLDRAM), a Rambus direct RAM (RDRAM), a direct Rambus dynamic RAM (DRDRAM), and a Rambus dynamic RAM (RDRAM).

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present application, and their description is specific and detailed, but cannot therefore be understood as a limitation on the patent scope of the present application. It should be noted that those of ordinary skill in the art may further make variations and improvements without departing from the conception of the present application, all of which fall within the protection scope of the present application. Therefore, the patent protection scope of the present application should be subject to the appended claims.

The invention claimed is:

1. A distributed antenna system, comprising: at least two digital-analog expansion units and at least two remote cascade chains, each of the at least two digital-analog expansion units being connected to at least one of the at least two remote cascade chains respectively, each of the at least two remote cascade chains including a plurality of remote units cascadingly connected by means of radio frequency cable, and each of the at least two digital-analog expansion units including a radio frequency front end module connected to a first remote unit of the plurality of remote units of a respective remote cascade chain of the at least two remote cascade chains by means of radio frequency cable;

wherein each of the at least two digital-analog expansion units is configured to perform, through a first baseband processing module inside the digital-analog expansion unit, a baseband processing operation on a downlink digital radio frequency signal transmitted by a source unit through an optical fiber, and perform digital-to-analog conversion through a first signal conversion module inside the digital-analog expansion unit, to obtain a downlink analog radio frequency signal to be transmitted to the respective remote cascade chain; or the digital-analog expansion unit is configured to perform, through the first signal conversion module, analog-to-digital conversion on an uplink analog radio frequency signal transmitted by the respective remote cascade chain, and perform a baseband processing operation through the first baseband processing module, to obtain an uplink digital radio frequency signal to be transmitted to the source unit through an optical fiber; and wherein the remote unit is configured to perform analog radio frequency signal interaction with a terminal device, and two adjacent ones of the remote units performing analog radio frequency signal interaction by means of the radio frequency cable.

2. The distributed antenna system according to claim 1, wherein: each of the at least two digital-analog expansion units comprises a first optical transceiver module, the first baseband processing module, the first signal conversion module and the radio frequency front end module successively connected;

the first optical transceiver module is configured to perform optical signal interaction with the source unit;

the first baseband processing module is configured to perform a baseband processing operation on a received signal and then output the signal;

the first signal conversion module is configured to perform digital radio frequency signal interaction with the baseband processing module and perform analog radio frequency signal interaction with the radio frequency front end module; and the radio frequency front end module is configured to perform analog radio frequency signal interaction with the remote unit and configured to perform analog radio frequency signal processing.

3. The distributed antenna system according to claim 2, wherein one of the digital-analog expansion units is connected to the source unit through an optical fiber, and two adjacent ones of the at least two digital-analog expansion units are cascaded through an optical fiber.

4. The distributed antenna system according to claim 3, wherein each of the at least two digital-analog expansion units is further configured to frame the downlink digital radio frequency signal transmitted by the source unit, and transmit the framed digital radio frequency signal to an adjacent digital-analog expansion unit through an optical fiber.

5. The distributed antenna system according to claim 3, wherein each of the at least two digital-analog expansion units is further configured to:

if a signal feature of a first uplink digital radio frequency signal is the same as that of a second uplink digital radio frequency signal, digitally combine the first uplink digital radio frequency signal with the second uplink digital radio frequency signal to obtain a third uplink digital radio frequency signal of a current digital-analog expansion unit, convert the third uplink digital radio frequency signal to obtain an uplink optical signal of the current digital-analog expansion unit, and transmit the uplink optical signal to an upper-stage digital-analog expansion unit or the source unit, wherein the first uplink digital radio frequency signal is obtained by processing the uplink optical signal of a lower-stage digital-analog expansion unit by the current digital-analog expansion unit, and the second uplink digital radio frequency signal is obtained by performing analog-to-digital conversion and baseband processing on the uplink analog radio frequency signal of the respective remote cascade chain connected to the current digital-analog expansion unit by the current digital-analog expansion unit; and if the signal feature of the first uplink digital radio frequency signal is different from that of the second uplink digital radio frequency signal, convert the first uplink digital radio frequency signal and the second uplink digital radio frequency signal respectively to obtain corresponding uplink optical signals, and transmit the uplink optical signals to the upper-stage digital-analog expansion unit or the source unit.

6. The distributed antenna system according to claim 2, wherein each of the at least two digital-analog expansion units further includes a first monitoring circuit, a power supply circuit and a first coupler that is connected to the first remote unit of the respective remote cascade chain by means of radio frequency cable;

the first coupler is connected to the first baseband processing module, the radio frequency front end module, the first monitoring circuit and the power supply circuit; and the first coupler is configured to perform at least one of operations including: coupling uplink and downlink switching signals generated by the first baseband processing module to the radio frequency cable, coupling a power signal to the radio frequency cable, performing monitoring signal interaction with the remote unit, and performing analog radio frequency signal interaction with the remote unit.

7. The distributed antenna system according to claim 6, wherein the remote unit includes at least one communication link module, two adjacent remote units are connected through a bundling radio frequency cable, the bundling radio frequency cable includes at least one radio frequency cable, and one of the at least one radio frequency cable is correspondingly connected to one communication link module of a lower-stage remote unit.

8. The distributed antenna system according to claim 7, wherein: the communication link module includes a second coupler, a radio frequency interaction circuit, a second monitoring circuit, a power conversion circuit and an uplink and downlink switching circuit;

the second coupler is connected to the first coupler or a communication link module of an upper-stage remote unit by means of radio frequency cable, the second coupler is connected to the radio frequency interaction circuit, the second monitoring circuit, the power conversion circuit and the uplink and downlink switching circuit, and the radio frequency interaction circuit is connected to the power conversion circuit and the uplink and downlink switching circuit; and the second coupler is configured to perform at least one of operations including: acquiring a power signal, acquiring an uplink and downlink switching signal, performing monitoring signal interaction with the digital-analog expansion unit, performing analog radio frequency signal interaction with the digital-analog expansion unit, and performing analog radio frequency signal interaction with the lower-stage remote unit.

9. The distributed antenna system according to claim 1, wherein the remote unit is further configured to: acquire a first uplink analog radio frequency signal of the terminal device and a second uplink analog radio frequency signal transmitted by a lower-stage remote unit, and combine the first uplink analog radio frequency signal with the second uplink analog radio frequency signal to obtain an uplink analog radio frequency signal of a current remote unit; and transmit the uplink analog radio frequency signal to an upper-stage remote unit or the digital-analog expansion unit.

10. The distributed antenna system according to claim 1, further comprising the source unit connected to the digital-analog expansion unit, wherein:

the source unit is a BBU or an RRU;

if the source unit is the RRU, the distributed antenna system further includes an access unit connected between the RRU and the digital-analog expansion unit; and the access unit is configured to perform a baseband processing operation on a received external signal through a second baseband processing module inside the access unit, and to perform interconversion of an analog radio frequency signal and a digital radio frequency signal through a second signal conversion module inside the access unit, to obtain a third uplink analog radio frequency signal to be transmitted to the RRU or a downlink digital radio frequency signal to be transmitted to the digital-analog expansion unit.

11. The distributed antenna system according to claim 10, wherein: the access unit includes a second optical transceiver module, the second baseband processing module, the second signal conversion module and a radio frequency channel module successively connected;

the second optical transceiver module is configured to perform optical signal interaction with the digital-analog expansion unit;

the second baseband processing module is configured to perform baseband processing on a received signal and then output the signal;

the second signal conversion module is configured to perform digital radio frequency signal interaction with the second baseband processing module and perform analog radio frequency signal interaction with the radio frequency channel module; and the radio frequency channel module is configured to perform analog radio frequency signal interaction with the RRU and configured to perform analog radio frequency signal processing.

12. A signal transmission method, wherein: the signal transmission method is applied to a distributed antenna system; the distributed antenna system includes: at least two digital-analog expansion units and at least two remote cascade chains, each of the at least two digital-analog expansion units being connected to at least one of the at least two remote cascade chains respectively, each of the remote cascade chains including a plurality of remote units cascadingly connected by means of radio frequency cable, and each of the at least two digital-analog expansion units including a radio frequency front end module connected to a first remote unit of the plurality of remote units of a respective remote cascade chain of the at least two remote cascade chains by means of radio frequency cable; and the signal transmission method includes:

acquiring, by the remote unit, a first uplink analog radio frequency signal of a terminal device and a second uplink analog radio frequency signal transmitted by a lower-stage remote unit;

combining, by the remote unit, the first uplink analog radio frequency signal with the second uplink analog radio frequency signal to obtain an uplink analog radio frequency signal of a current remote unit, and transmitting the uplink analog radio frequency signal of the current remote unit to an upper-stage remote unit or the digital-analog expansion unit; and performing, by the digital-analog expansion unit, analog-to-digital conversion and baseband processing on the acquired uplink analog radio frequency signal, to obtain an uplink digital radio frequency signal to be transmitted to the source unit through an optical fiber.

13. The signal transmission method according to claim 12, wherein: two adjacent ones of the at least two digital-analog expansion units are cascaded by optical fibers through respective optical transceiver modules, and a first digital-analog expansion unit of the at least two digital-analog expansion units is connected to the source unit through an optical fiber; and the signal transmission method further includes:

determining, by the digital-analog expansion unit according to whether features of multi-channel signals received by a current digital-analog expansion unit are the same, whether to digitally combine the received multi-channel signals;

if a signal feature of a first uplink digital radio frequency signal is the same as that of a second uplink digital radio frequency signal, digitally combining, by the digital-analog expansion unit, the first uplink digital radio frequency signal with the second uplink digital radio frequency signal to obtain a third uplink digital radio frequency signal of the current digital-analog expansion unit, converting the third uplink digital radio frequency signal to obtain an uplink optical signal of the current digital-analog expansion unit, and transmitting the uplink optical signal to an upper-stage digital-analog expansion unit or the source unit, wherein the first uplink digital radio frequency signal is obtained by processing the uplink optical signal of a lower-stage digital-analog expansion unit by the current digital-analog expansion unit; the second uplink digital radio frequency signal is obtained by performing analog-to-digital conversion and baseband processing on the uplink analog radio frequency signal of the remote cascade chain connected to the current digital-analog expansion unit by the current digital-analog expansion unit;

if the signal feature of the first uplink digital radio frequency signal is different from that of the second uplink digital radio frequency signal, converting, by the digital-analog expansion unit, the first uplink digital radio frequency signal and the second uplink digital radio frequency signal respectively to obtain corresponding uplink optical signals, and transmitting the uplink optical signals to the upper-stage digital-analog expansion unit or the source unit; and framing, by the digital-analog expansion unit, a downlink digital radio frequency signal transmitted by the source unit, and transmitting the framed digital radio frequency signal transparently to a lower-stage digital-analog expansion unit through an optical fiber.

14. A signal transmission method, wherein: the signal transmission method is applied to a distributed antenna system; the distributed antenna system includes: at least two digital-analog expansion units and at least two remote cascade chains, each of the at least two digital-analog expansion units being connected to at least one of the at least two remote cascade chains respectively, each of the remote cascade chains including a plurality of remote units cascadingly connected by means of radio frequency cable, and each of the at least two digital-analog expansion units including a radio frequency front end module connected to a first remote unit of the plurality of remote units of a respective remote cascade chain of the at least two remote cascade chains by means of radio frequency cable; and the signal transmission method includes:

performing, by the digital-analog expansion unit, baseband processing and digital-to-analog conversion on a downlink digital radio frequency signal transmitted by a source unit through an optical fiber, to obtain a downlink analog radio frequency signal, and transmitting the downlink analog radio frequency signal to the remote cascade chain; and acquiring, by the remote unit, the downlink analog radio frequency signal, and performing downlink radio frequency signal transmission based on the downlink analog radio frequency signal.

15. The signal transmission method according to claim 14, wherein: two adjacent ones of the digital-analog expansion units are cascaded by optical fibers through respective optical transceiver modules, and a first digital-analog expansion unit of the at least two digital-analog expansion units is connected to the source unit through an optical fiber; and the signal transmission method further includes:

determining, by the digital-analog expansion unit according to whether features of multi-channel signals received by a current digital-analog expansion unit are the same, whether to digitally combine the received multi-channel signals;

if a signal feature of a first uplink digital radio frequency signal is the same as that of a second uplink digital radio frequency signal, digitally combining, by the digital-analog expansion unit, the first uplink digital radio frequency signal with the second uplink digital radio frequency signal to obtain a third uplink digital radio frequency signal of the current digital-analog expansion unit, converting the third uplink digital radio frequency signal to obtain an uplink optical signal of the current digital-analog expansion unit, and transmitting the uplink optical signal to an upper-stage digital-analog expansion unit or the source unit; wherein the first uplink digital radio frequency signal is obtained by processing the uplink optical signal of a lower-stage digital-analog expansion unit by the current digital-analog expansion unit; the second uplink digital radio frequency signal is obtained by performing analog-to-digital conversion and baseband processing on the uplink analog radio frequency signal of the remote cascade chain connected to the current digital-analog expansion unit by the current digital-analog expansion unit;

if the signal feature of the first uplink digital radio frequency signal is different from that of the second uplink digital radio frequency signal, converting, by the digital-analog expansion unit, the first uplink digital radio frequency signal and the second uplink digital radio frequency signal respectively to obtain corresponding uplink optical signals, and transmitting the uplink optical signals to the upper-stage digital-analog expansion unit or the source unit; and framing, by the digital-analog expansion unit, a downlink digital radio frequency signal transmitted by the source unit, and transmitting the framed digital radio frequency signal transparently to a lower-stage digital-analog expansion unit through an optical fiber.

16. A gain control method, wherein: the gain control method is applied to a distributed antenna system; the distributed antenna system includes: a digital-analog expansion unit and a remote cascade chain, the remote cascade chain including a plurality of remote units cascadingly connected by means of radio frequency cable, and a first remote unit of the remote cascade chain being connected to the digital-analog expansion unit by means of radio frequency cable; and the gain control method includes:

acquiring, by the remote unit, a radio frequency signal transmitted by the digital-analog expansion unit by means of radio frequency cable, and measuring the radio frequency signal, to obtain a first power value, wherein the radio frequency signal is a signal generated by the digital-analog expansion unit according to a preset frequency band and a preset power value;

obtaining, by the remote unit, a radio frequency signal insertion loss based on the first power value and the preset power value, and obtaining a cable length according to the radio frequency signal insertion loss and the preset frequency band; and obtaining, by the remote unit, a target signal insertion loss based on the cable length and a target signal frequency band, and matching an attenuation value of a digital control attenuator based on the target signal insertion loss, target transmitting power and a gain value.

17. A gain control apparatus, wherein: the gain control apparatus is applied to a distributed antenna system; the distributed antenna system includes: a digital-analog expansion unit and a remote cascade chain, the remote cascade chain including a plurality of remote units cascadingly connected by means of radio frequency cable, and a first remote unit of the remote cascade chain being connected to the digital-analog expansion unit by means of radio frequency cable; the gain control apparatus is arranged in each of the remote units; and the gain control apparatus includes:
- a power measurement module configured to acquire a radio frequency signal transmitted by the digital-analog expansion unit by means of radio frequency cable, and measure the radio frequency signal, to obtain a first power value, wherein the radio frequency signal is a signal generated by the digital-analog expansion unit according to a preset frequency band and a preset power value;
- a cable length acquisition module configured to obtain a radio frequency signal insertion loss based on the first power value and the preset power value, and obtain a cable length according to the radio frequency signal insertion loss and the preset frequency band; and
- an attenuation value matching module configured to obtain a target signal insertion loss based on the cable length and a target signal frequency band, and match an attenuation value of a digital control attenuator based on the target signal insertion loss, target transmitting power and a gain value.

* * * * *